US012640879B2

(12) United States Patent
Baskaran et al.

(10) Patent No.: US 12,640,879 B2
(45) Date of Patent: May 26, 2026

(54) METHOD AND UE FOR BEAM BEHAVIOR OF CSI-RS FOR FEMIMO

(71) Applicant: Samsung Electronics Co., Ltd., Gyeonggi-do (KR)

(72) Inventors: Dhivagar Baskaran, Bangalore (IN); Youngrok Jang, Gyeonggi-do (KR); Taehyoung Kim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 242 days.

(21) Appl. No.: 18/260,833

(22) PCT Filed: Jan. 12, 2022

(86) PCT No.: PCT/KR2022/000587
§ 371 (c)(1),
(2) Date: Jul. 10, 2023

(87) PCT Pub. No.: WO2022/154493
PCT Pub. Date: Jul. 21, 2022

(65) Prior Publication Data
US 2024/0063973 A1     Feb. 22, 2024

(30) Foreign Application Priority Data

Jan. 12, 2021    (IN) ............................. 202141001456
Jan. 5, 2022    (IN) ............................. 202141001456

(51) Int. Cl.
*H04W 4/00*          (2018.01)
*H04B 7/06*          (2006.01)
(Continued)

(52) U.S. Cl.
CPC ....... *H04L 5/0051* (2013.01); *H04B 7/06968* (2023.05); *H04L 5/0053* (2013.01); *H04W 72/232* (2023.01)

(58) Field of Classification Search
None
See application file for complete search history.

(56) References Cited

U.S. PATENT DOCUMENTS

2020/0196383 A1     6/2020  Tsai et al.
2020/0288479 A1*    9/2020  Xi ......................... H04L 5/0092
(Continued)

FOREIGN PATENT DOCUMENTS

WO     WO 2020/088101        8/2020

OTHER PUBLICATIONS

PCT/ISA/210 Search Report dated Apr. 22, 2022, issued on PCT/KR2022/000587, pp. 4.
(Continued)

*Primary Examiner* — Zewdu A Beyen
(74) *Attorney, Agent, or Firm* — The Farrell Law Firm, P.C.

(57) ABSTRACT

The present disclosure relates to a pre-5th generation (5G) or 5G communication system to be provided for supporting higher data rates beyond 4th generation (4G) communication system such as long term evolution (LTE). Embodiments herein provide a method for beam behavior of CSI-RS for FeMIMO. The method performed by a UE includes sending UE capability information comprising a beamSwitchTiming to at least one B S. The beamSwitchTiming indicates a minimum number of OFDM symbols between DCI triggering of aperiodic CSI-RS and aperiodic CSI-RS transmission. Further, the method includes receiving a PDCCH DCI for reception of the aperiodic CSI-RS from the at least one BS. Further, the method includes determining a default beam rule for reception of the aperiodic CSI-RS triggered by the DCI. Further, the method includes receiving the aperiodic CSI-RS from the at least one BS. Furthermore, (Continued)

the method includes processing the aperiodic CSI-RS by applying the default beam rule.

16 Claims, 16 Drawing Sheets

(51) Int. Cl.
  *H04L 5/00*        (2006.01)
  *H04W 72/232*      (2023.01)

(56)                References Cited

U.S. PATENT DOCUMENTS

2021/0242926 A1     8/2021  Yang et al.
2021/0258964 A1*    8/2021  Khoshnevisan ..... H04B 7/0478
2023/0224953 A1*    7/2023  Xiong ................... H04L 5/0044
                                              370/329

OTHER PUBLICATIONS

PCT/ISA/237 Written Opinion dated Apr. 22, 2022, issued on PCT/KR2022/000587, pp. 4.

Indian Office Action dated Aug. 24, 2022, issue on Indian Application No. 202141001456, pp. 7.
Apple Inc., "Remaining Issues for Multi-TRP Enhancement", R1-2006494, 3GPP TSG-RAN WG1 Meeting #102-e, e-Meeting, Aug. 8, 2020, pp. 10.
3GPP TS 38.214 V16.4.0, (Jan. 8, 2021), Technical Specification, pp. 171.
Qualcomm Incorporated, "Remaining issue on multi-beam operation", R1-2008611, 3GPP TSG RAN WG1 Meeting #103-e, Nov. 1, 2020, pp. 7.
Ericsson, "Enhancements to multi-beam operation", R1-2005842, 3GPP TSG-RAN WG1 Meeting #102-e, e-Meeting, Aug. 7, 2020, pp. 16.
3GPP TS 38.306 V16.3.0 (Dec. 2020), Technical Specification, pp. 135.
European Search Report dated Oct. 11, 2024 issued in counterpart application No. 22739688.4-1206, 11 pages.

* cited by examiner

FIG. 1A
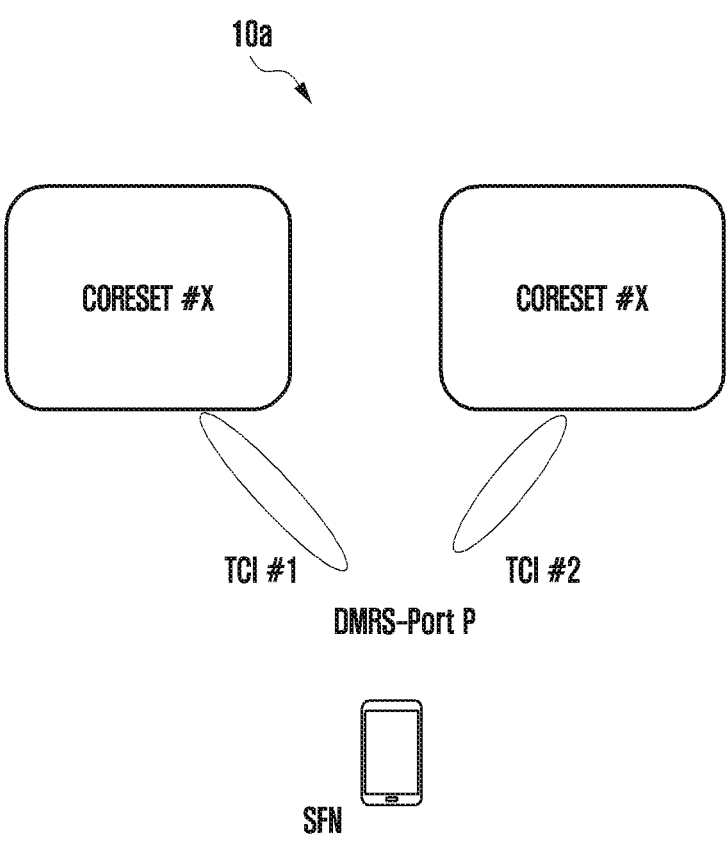
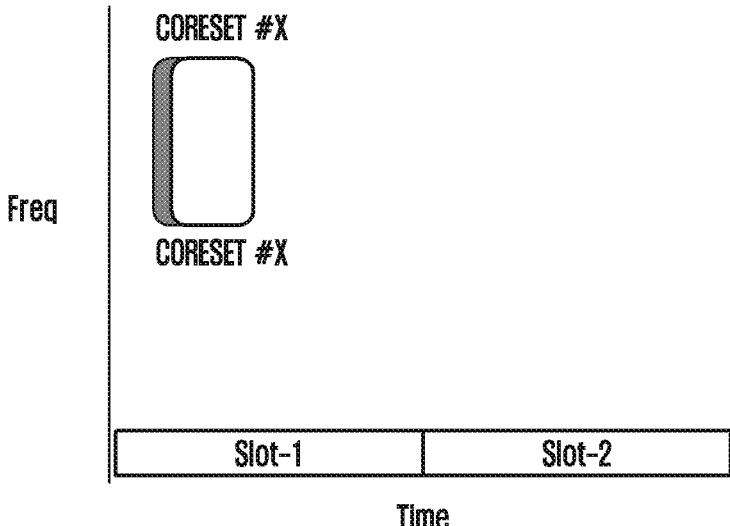

CORESET #X or #Y

CORESET #X or #Y

TCI #1

TCI #2

NON-SFN

Freq

CORESET #X / #Y

CORESET #X / #Y

| Slot-1 | Slot-2 |

Time

CORESET #X / #Y    CORESET #X / #Y

Freq

| Slot-1 | Slot-2 |

Time

CORESET #X / #Y    CORESET #X / #Y

Freq

| Slot-1 | Slot-2 |

Time

CORESET #X / #Y

Freq

CORESET #X / #Y

| Slot-1 | Slot-2 |

Time

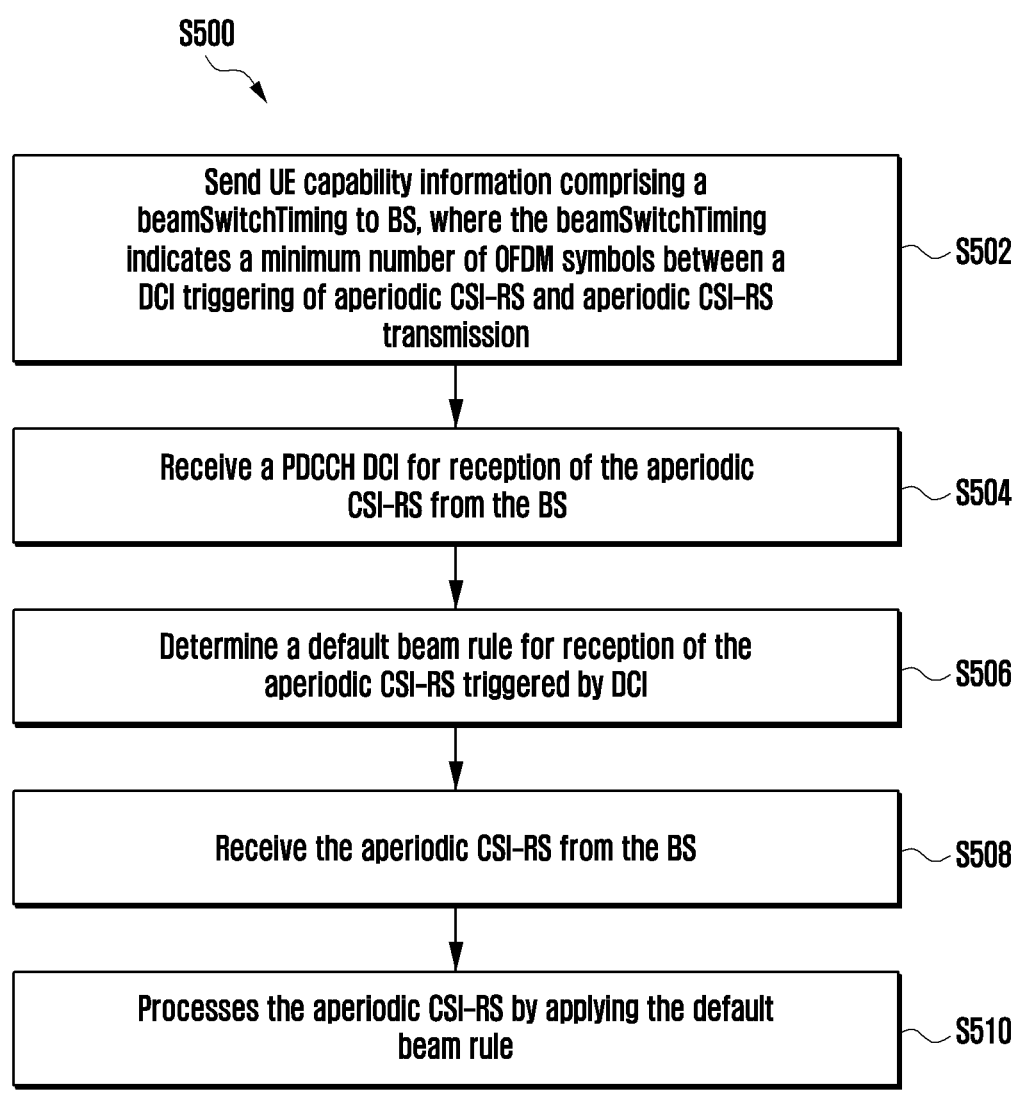

S500

Send UE capability information comprising a
beamSwitchTiming to BS, where the beamSwitchTiming
indicates a minimum number of OFDM symbols between a
DCI triggering of aperiodic CSI-RS and aperiodic CSI-RS
transmission ... S502

Receive a PDCCH DCI for reception of the aperiodic
CSI-RS from the BS ... S504

Determine a default beam rule for reception of the
aperiodic CSI-RS triggered by DCI ... S506

Receive the aperiodic CSI-RS from the BS ... S508

Processes the aperiodic CSI-RS by applying the default
beam rule ... S510

FIG. 8B

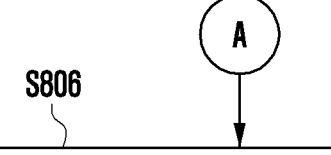

S806

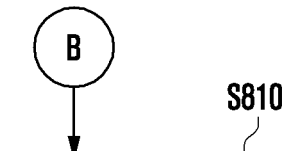

S810

UE applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming when the reported value is one of the values {14,28,48} and enableBeamSwitchTiming-r16 is not provided, aperiodic CSI-RS scheduled with offset larger than or equal to 48 when the reported value of beamSwitchTiming-r16 is one of the values {224, 336} and enableBeamSwitchTiming-r16 is provided, periodic CSI-RS, semi-persistent CSI-RS Option 1-1: QCL assumption corresponding to the lowest TCI state ID used for PDCCH quasi co-location indication of the CORESET associated with a monitored search space with the lowest controlResourceSetId Option 1-2: QCL assumption corresponding to the highest TCI state ID used for PDCCH quasi co-location indication of the CORESET associated with a monitored search space with the lowest controlResourceSetId Option 1-3: QCL assumption corresponding to the first TCI state ID used for PDCCH quasi co-location indication of the CORESET associated with a monitored search space with the lowest controlResourceSetId Option 1-4: QCL assumption corresponding to the last TCI state ID used for PDCCH quasi co-location indication of the CORESET associated with a monitored search space with the lowest controlResourceSetId Option 2:QCL assumption used for the CORESET associated with a monitored search space with the lowest controlResourceSetId, configured with a single TCI state Solution 3: QCL assumption used for the CORESET associated with a monitored search space with the lowest controlResourceSetId; where the QCL assumption is a combination of the QCL parameters corresponding to the TCI states configured for the CORESET

FIG. 9B

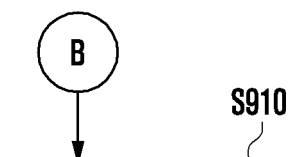

S906

UE applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming when the reported value is one of the values {14,28,48} and enableBeamSwitchTiming-r16 is not provided, aperiodic CSI-RS scheduled with offset larger than or equal to 48 when the reported value of beamSwitchTiming-r16 is one of the values {224, 336} and enableBeamSwitchTiming-r16 is provided, periodic CSI-RS, semi-persistent CSI-RS

S910

Option 1: QCL assumption used for the CORESET associated with a monitored search space with the lowest controlResourceSetId
Option 2: QCL assumption used for the CORESET associated with a monitored search space with the lowest controlResourceSetIdcombined with the QCL assumption of any CORESET linked with the CORESET with the lowest controlResourceSetId for PDCCH repetition

FIG. 10A

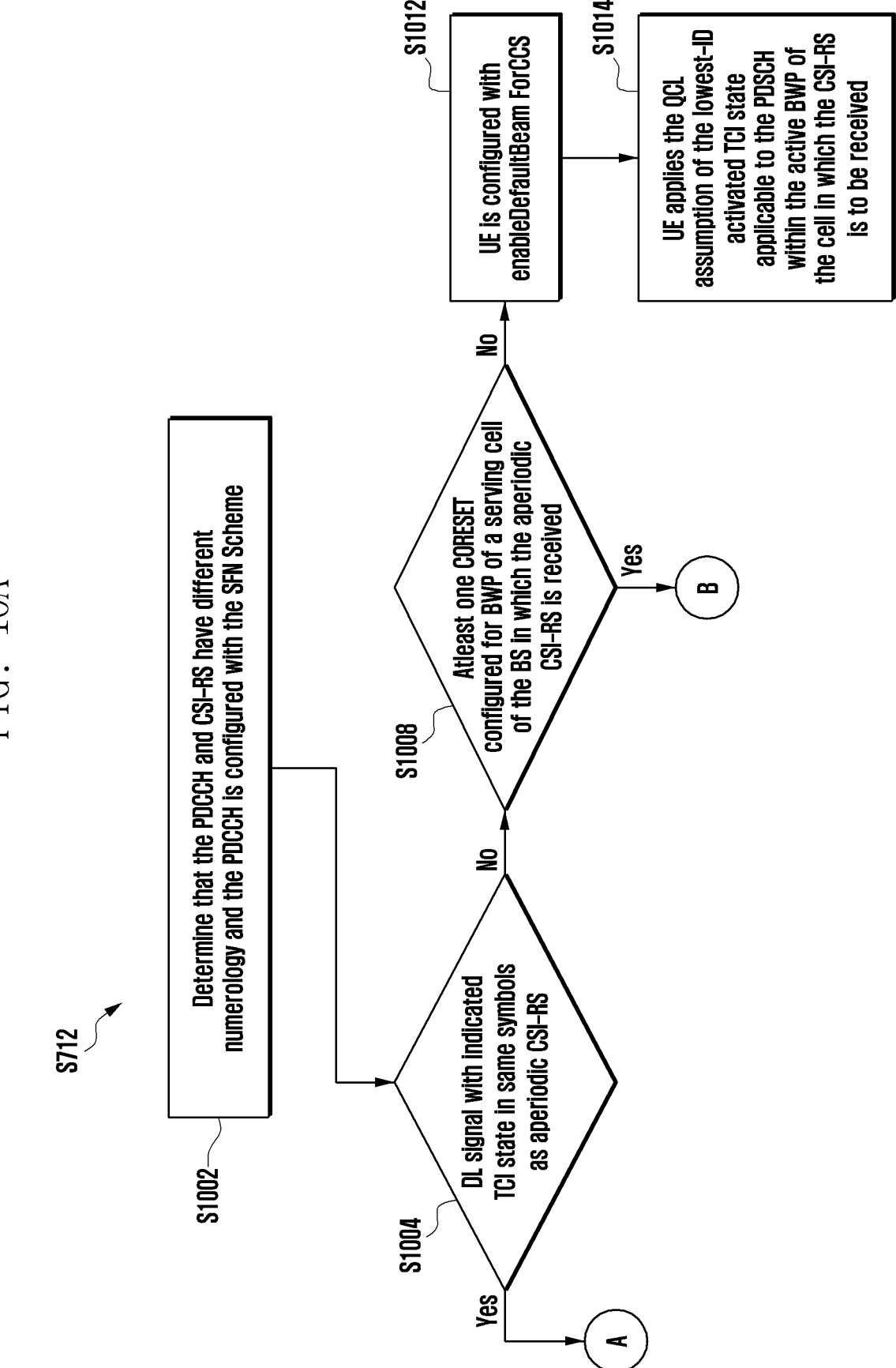

S712

S1002

Determine that the PDCCH and CSI-RS have different numerology and the PDCCH is configured with the SFN Scheme

S1004

DL signal with indicated TCI state in same symbols as aperiodic CSI-RS

Yes → A

No

S1008

Atleast one CORESET configured for BWP of a serving cell of the BS in which the aperiodic CSI-RS is received Yes → B No

S1012

UE is configured with enableDefaultBeam ForCCS

S1014

UE applies the QCL assumption of the lowest-ID activated TCI state applicable to the PDSCH within the active BWP of the cell in which the CSI-RS is to be received

FIG. 10B

S1006

UE applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming $+ d \cdot 2^{[\mu CSIRS]} / 2^{\wedge(\mu PDCCH)}$ in CSI-RS symbols when the reported value is one of the values {14,28,48} and enableBeamSwitchTiming-r16 is not provided, aperiodic CSI-RS scheduled with offset larger than or equal to $48 + d \cdot 2^{[\mu CSIRS]} / 2^{(\mu PDCCH)}$ in CSI-RS symbols when the reported value of beamSwitchTiming-r16 is one of the values {224, 336} and enableBeamSwitchTiming-r16 is provided, periodic CSI-RS, semi-persistent CSI-RS

S1010

Option 1-1: QCL assumption corresponding to the lowest TCI state ID used for PDCCH quasi co-location indication of the CORESET associated with a monitored search space with the lowest controlResourceSetId Option 1-2: QCL assumption corresponding to the highest TCI state ID used for PDCCH quasi co-location indication of the CORESET associated with a monitored search space with the lowest controlResourceSetId Option 1-3: QCL assumption corresponding to the first TCI state ID used for PDCCH quasi co-location indication of the CORESET associated with a monitored search space with the lowest controlResourceSetId Option 1-4: QCL assumption corresponding to the last TCI state ID used for PDCCH quasi co-location indication of the CORESET associated with a monitored search space with the lowest controlResourceSetId Option 2:QCL assumption used for the CORESET associated with a monitored search space with the lowest controlResourceSetId, configured with a single TCI state Solution 3: QCL assumption used for the CORESET associated with a monitored search space with the lowest controlResourceSetId; where the QCL assumption is a combination of the QCL parameters corresponding to the TCI states configured for the CORESET

FIG. 11B

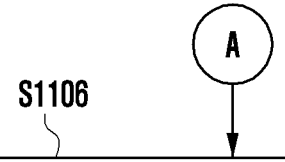

S1106 if there is any other DL signal with an indicated TCI state in the same symbols as the CSI-RS, the UE applies the QCL assumption of the other DL signal also when receiving the aperiodic CSI-RS.
The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming + d · $2^{(\mu CSIRS)}$ / $2^{(\mu PDCCH)}$ in CSI-RS symbols when the reported value is one of the values {14,28,48}andenableBeamSwitchTiming-r16 is not provided, aperiodic CSI-RS scheduled with offset larger than or equal to 48+ d · $2^{(\mu CSIRS)}$ / $2^{(\mu PDCCH)}$ in CSI-RS symbols when the reported value of beamSwitchTiming-r16 is one of the values {224, 336} andenableBeamSwitchTiming-r16 is provided, periodic CSI-RS, semi-persistent CSI-RS;

S1110

Option 1: QCL assumption used for the CORESET associated with a monitored search space with the lowest controlResourceSetId
Option 2: QCL assumption used for the CORESET associated with a monitored search space with the lowest controlResourceSetIdcombined with the QCL assumption of any CORESET linked with the CORESET with the lowest controlResourceSetId for PDCCH repetition

METHOD AND UE FOR BEAM BEHAVIOR OF CSI-RS FOR FEMIMO

PRIORITY

This application is a National Phase Entry of PCT International Application No. PCT/KR2022/000587, which was filed on Jan. 12, 2022, and claims priority to Indian patents application Nos. 202141001456 and 202141001456, which were filed on Jan. 12, 2021, and Jan. 5, 2022, respectively, the entire content of each of which is incorporated herein by reference.

TECHNICAL FIELD

The present disclosure relates to a wireless network, and more specifically related to a method and a User Equipment (UE) for beam behavior of channel state information reference signal (CSI-RS) for Further enhanced Multiple Input Multiple Out (FeMIMO) in the wireless network. This application is based on and derives the benefit of Indian Provisional Application 202141001456 filed on 12 Jan. 2021, the contents of which are incorporated herein by reference.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a part of further enhancing the existing 5th generation (5G) new radio (NR), control channel transmissions are being redesigned for better reliability and performance. One such enhancement is multi transmit receive point (mTRP) based enhancement of physical downlink control channel (PDCCH). The enhancement focuses on improving the reliability of PDCCH by transmitting from different TRPs in different ways.

Since a control resource set (CORESET) and a PDCCH configuration are enhanced to accommodate different TRPs, the default beam behaviors defined in the current standards for CSI-RS needs to be modified. Thus, it is desired to address the above mentioned disadvantages or other shortcomings or at least provide a useful alternative.

DISCLOSURE OF INVENTION

Technical Problem

The principal object of the embodiments herein is to provide a method and a UE beam behavior of a CSI-RS for a FeMIMO in a wireless network.

Solution to Problem

Accordingly, the embodiment herein is to disclose a method for beam behavior of CSI-RS for FeMIMO. The method includes sending, by a UE, UE capability information comprising a beamSwitchTiming to at least one Base Station (BS). The beamSwitchTiming indicates a minimum number of OFDM symbols between a Downlink Control Information (DCI) triggering of aperiodic CSI-RS and aperiodic CSI-RS transmission. Further, the method includes receiving, by the UE, a Physical downlink Control Channel (PDCCH) DCI for reception of the aperiodic CSI-RS from the at least one BS. Further, the method includes determining, by the UE, a default beam rule for reception of the aperiodic CSI-RS triggered by the DCI. Further, the method includes receiving, by the UE, the aperiodic CSI-RS from the at least one BS. Furthermore, the method includes processing, by the UE, the aperiodic CSI-RS by applying the default beam rule.

In an embodiment, determining, by the UE, the default beam rule based on the PDCCH DCI for reception of the aperiodic CSI-RS includes determining, by the UE, that a numerology of the PDCCH DCI is same as a numerology of the aperiodic CSI-RS and a scheduling offset between a last symbol of the PDCCH carrying the triggering DCI and a first symbol of the aperiodic CSI-RS is smaller than the beamSwitchTiming, determining, by the UE, whether the PDCCH is configured with a Single frequency network (SFN) configuration or non-SFN configuration, and performing, by the UE, one of: determining the default beam rule based on the SFN configuration in response to determining that the PDCCH is configured with the SFN configuration, and determining the default beam rule based on the non-SFN configuration in response to determining that the PDCCH is configured with the non-SFN configuration.

In an embodiment, determining the default beam rule based on the SFN configuration includes determining, by the UE, whether one of a Downlink (DL) signal with an indicated Transmission Configuration Indicator (TCI) state in same symbols as the aperiodic CSI-RS, one or more CORESET configured for an active Bandwidth Part (BWP) of a serving cell of the at least one BS in which the aperiodic CSI-RS is received, the UE is configured with enableDefaultBeamForCCS and performing, by the UE, one of: determining the default beam rule comprising applying a Quasi Co Location (QCL) assumption of the DL signal upon receiving the aperiodic CSI-RS at the UE, in response to determining the DL signal with the indicated TCI state in same symbols as the aperiodic CSI-RS, wherein the DL signal comprises at least one of the PDSCH scheduled with an offset larger than or equal to a threshold timeDuration-ForQCL assumption, or the aperiodic CSI-RS scheduled with an offset larger than or equal to the beamSwitchTiming reported by the UE or a periodic CSI-RS or a semipersistent CSI-RS, determining the default beam rule comprising applying a QCL assumption, upon receiving the aperiodic CSI-RS, in a latest slot in which the one or more CORESETs within the active BWP of the serving cell are monitored based on the one or more CORESET configured with more than one TCI state through PDCCH MAC-CE to support the SFN configuration for the PDCCH, in response to determining the one or more CORESET configured for the active BWP in which the aperiodic CSI-RS is received, and determining the default beam rule comprising applying a QCL assumption corresponding to a lowest-ID activated TCI state applicable to the PDSCH within the active BWP of the serving cell of the BS in which the CSI-RS is to be received, in response to determining the UE is configured with enableDefaultBeamFor CSS.

In an embodiment, applying the QCL assumption upon receiving the aperiodic CSI-RS based on the one or more CORESET configured with more than one TCI state through PDCCH Medium access control-Control Element (MAC-CE) to support the SFN configuration for the PDCCH comprises one of applying the QCL assumption corresponding to a lowest TCI state Identifier (ID) used for a PDCCH quasi colocation indication of the CORESET associated with a monitored search space with a lowest control Resource Set ID, applying the QCL assumption corresponding to a highest TCI state ID used for a PDCCH quasi co-location indication of the CORESET associated with a monitored search space with a lowest control Resource Set ID, applying the QCL assumption corresponding to a first TCI state ID used for a PDCCH quasi co-location indication of the CORESET associated with a monitored search space with a lowest control Resource Set ID, applying the QCL assumption corresponding to a last TCI state ID used for a PDCCH quasi co-location indication of the CORESET associated with a monitored search space with a lowest control Resource Set ID, applying the QCL assumption used for the CORESET associated with a monitored search space with the lowest control Resource Set ID, configured with a single TCI state, and applying the QCL assumption used for the CORESET associated with a monitored search space with a lowest control Resource Set ID, wherein the QCL assumption is a combination of QCL parameters corresponding to the TCI states configured for the CORESET.

In an embodiment, determining the default beam rule based on the non-SFN configuration includes determining, by the UE, whether one of a DL signal with an indicated TCI state in same symbols as the aperiodic CSI-RS, one or more CORESET configured for an active BWP in which the aperiodic CSI-RS is received, the UE is configured with enableDefaultBeamForCCS, and performing, by the UE, one of determining the default beam rule comprising applying a QCL assumption of the DL signal upon receiving the aperiodic CSI-RS at the UE, in response to determining the DL signal with the indicated TCI state in same symbols as the aperiodic CSI-RS, wherein the DL signal comprises at least one of the PDSCH scheduled with an offset larger than or equal to a threshold timeDurationForQCL, or, aperiodic CSI-RS scheduled with an offset larger than or equal to the beamSwitchTiming reported by the UE or a periodic CSI-RS, or a semi-persistent CSI-RS, determining the default beam rule comprising applying a QCL assumption, upon receiving the aperiodic CSI-RS, in a latest slot in which the one or more CORESETs within the active BWP of the serving cell are monitored, in response to determining the one or more CORESET configured for the BWP in which the aperiodic CSI-RS is received, and determining the default beam rule comprising applying a QCL assumption corresponding to a lowest-ID activated TCI state applicable to the PDSCH within the active BWP of the serving cell of the BS in which the CSI-RS is to be received, in response to determining the UE is configured with enableDefaultBeamForCCS.

In an embodiment, applying the QCL assumption in the latest slot in which the one or more CORESETs within the active BWP of the serving cell are monitored comprises one of: applying the QCL assumption used for the CORESETs associated with the monitored search space with a lowest control Resource Set ID, and applying the QCL assumption used for the CORESETs associated with the monitored search space with a lowest control Resource Set ID combined with the QCL assumption of any CORESET linked with the CORESET with the lowest control Resource Set ID for the PDCCH repetition.

In an embodiment, determining, by the UE, the default beam rule based on the PDCCH DCI for reception of the aperiodic CSI-RS includes determining, by the UE, that a numerology of the PDCCH DCI is different than a numerology of the aperiodic CSI-RS and a scheduling offset between a last symbol of the PDCCH carrying the triggering DCI and a first symbol of the aperiodic CSI-RS is smaller than the beamSwitchTiming plus a functional value, wherein the functional value is determined using a beam switching timing delay, subcarrier spacing configurations of CSI-RS and PDCCH in CSI-RS symbols reported by the UE, determining, by the UE, whether the PDCCH is configured with a SFN configuration or non-SFN configuration, and performing, by the UE, one of: determining the default beam rule based on the SFN configuration in response to determining that the PDCCH is configured with the SFN configuration, and determining the default beam rule based on the non-SFN configuration in response to determining that the PDCCH is configured with the non-SFN configuration.

In an embodiment, determining the default beam rule based on the SFN configuration includes determining, by the UE, whether one of a DL signal with an indicated TCI state in same symbols as the aperiodic CSI-RS, one or more CORESET configured for an active BWP of the serving cell in which the aperiodic CSI-RS is received, the UE is configured with enableDefaultBeamForCCS and performing, by the UE, one of determining the default beam rule comprising applying a QCL assumption of the DL signal upon receiving the aperiodic CSI-RS at the UE, in response to determining the DL signal with the indicated TCI state in same symbols as the aperiodic CSI-RS, wherein the DL signal comprises at least one of the PDSCH scheduled with an offset larger than or equal to a threshold timeDurationForQCL, or aperiodic CSI-RS scheduled with an offset larger than or equal to the beamSwitchTiming plus a functional value, wherein the functional value is determined using a beam switching timing delay, subcarrier spacing configurations of CSI-RS and PDCCH in CSI-RS symbols reported by the UE or a periodic CSI-RS, or a semipersistent CSI-RS, determining the default beam rule comprising applying a QCL assumption, upon receiving the aperiodic CSI-RS, in a latest slot in which the one or more CORESETs within the active BWP of the serving cell are monitored based on the one or more CORESET configured with more than one TCI state through PDCCH MAC-CE to support the SFN configuration for the PDCCH, in response to determining the one or more CORESET configured for the active BWP in which the aperiodic CSI-RS is received, and determining the default beam rule comprising applying a QCL assumption corresponding to a lowest-ID activated TCI state applicable to the PDSCH within the active BWP of the serving cell of the BS in which the CSI-RS is to be received, in response to determining the UE is configured with enableDefaultBeamForCCS.

In an embodiment, applying the QCL assumption upon receiving the aperiodic CSI-RS based on the one or more CORESET configured with more than one TCI state through PDCCH MAC-CE to support the SFN configuration for the PDCCH comprises one of: applying the QCL assumption corresponding to a lowest TCI state ID used for a PDCCH quasi co-location indication of the CORESET associated with a monitored search space with a lowest control Resource Set ID, applying the QCL assumption corresponding to a highest TCI state ID used for a PDCCH quasi co-location indication of the CORESET associated with a monitored search space with a lowest control Resource Set ID, applying the QCL assumption corresponding to a first TCI state ID used for a PDCCH quasi co-location indication of the CORESET associated with a monitored search space with a lowest control Resource Set ID, applying the QCL assumption corresponding to a last TCI state ID used for a PDCCH quasi colocation indication of the CORESET associated with a monitored search space with a lowest control Resource Set ID, applying the QCL assumption used for the CORESET associated with a monitored search space with the lowest control Resource Set ID, configured with a single TCI state, applying the QCL assumption used for the CORESET associated with a monitored search space with a lowest control Resource Set ID, wherein the QCL assumption is a combination of QCL parameters corresponding to the TCI states configured for the CORESET.

In an embodiment, determining the default beam rule based on the non-SFN configuration includes determining, by the UE, whether one of a DL signal with an indicated TCI state in same symbols as the aperiodic CSI-RS, one or more CORESET configured for an active BWP of the serving cell in which the aperiodic CSI-RS is received, the UE is configured with; enableDefaultBeamForCCS and performing, by the UE, one of determining the default beam rule comprising applying a QCL assumption of the DL signal upon receiving the aperiodic CSI-RS at the UE, in response to determining the DL signal with the indicated TCI state in same symbols as the aperiodic CSI-RS, wherein the DL signal refers to the PDSCH scheduled with an offset larger than or equal to the threshold timeDurationForQCL, or the aperiodic CSI-RS scheduled with an offset larger than or equal to the beamSwitchTiming plus a functional value, wherein the functional value is determined using a beam switching timing delay, subcarrier spacing configurations of CSI-RS and PDCCH CSI-RS symbols or a periodic CSI-RS, and a semi-persistent CSI-RS, determining the default beam rule comprising applying a QCL assumption, upon receiving the aperiodic CSI-RS, in a latest slot in which the one or more CORESETs within the active BWP of the serving cell are monitored, in response to determining the one or more CORESET configured for the active BWP of the serving cell in which the aperiodic CSI-RS is received, and determining the default beam rule comprising applying a QCL assumption corresponding to a lowest-ID activated TCI state applicable to the PDSCH within the active BWP of the serving cell in which the CSI-RS is to be received, in response to determining the UE is configured with enableDefaultBeamForCCS.

In an embodiment, applying the QCL assumption in the latest slot in which the one or more CORESETs within the active BWP of the serving cell are monitored comprises one of applying the QCL assumption used for the CORESET associated with the monitored search space with a lowest control Resource Set ID, and applying the QCL assumption used for the CORESET associated with the monitored search space with a lowest control Resource Set ID combined with the QCL assumption of any CORESET linked with the CORESET with the lowest control Resource Set ID for the PDCCH repetition.

Accordingly, the embodiment herein is to disclose a UE for beam behavior of CSI-RS for FeMIMO. The UE includes a beam behavior controller communicatively coupled to a memory and a processor. The beam behavior controller is configured to send UE capability information comprising a beamSwitchTiming to at least one BS. The beamSwitchTiming indicates a minimum number of OFDM symbols between a DCI triggering of aperiodic CSI-RS and aperiodic CSI-RS transmission. Further, the beam behavior controller is configured to receive a PDCCH DCI for reception of the aperiodic CSI-RS from the at least one BS. Further, the beam behavior controller is configured to determine a default beam rule for reception of the aperiodic CSI-RS triggered by DCI. Further, the beam behavior controller is configured to receive the aperiodic CSI-RS from the at least one BS. Further, the beam behavior controller is configured to process the aperiodic CSI-RS by applying the default beam rule.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

According to the disclosure, there is improvements in and relating to user equipment (UE) beam behavior of a channel state information-reference signal (CSI-RS).

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1a is an example illustration in which a SFN scheme for multi-TRP is depicted, according to prior art;

FIG. 1b is an example illustration in which a non-SFN schemes for multi-TRP is depicted, according to prior art;

FIG. 2 is an example scenario in which multi-beam operation involving corset, search space and TCI are depicted, according to prior art;

FIG. 5 is an flow chart illustrating a method for the beam behavior of the CSI-RS for the FeMIMO, according to an embodiment as disclosed herein;

FIG. 8*b* is an example flow diagram illustrating various operations for applying the default beam rule in the beam behavior of the CSI-RS for the FeMIMO when a numerology of a PDCCH DCI is same as a numerology of aperiodic CSI-RS and a PDCCH is configured with a SFN configuration, according to an embodiment as disclosed herein;

FIG. 9*b* is an example flow diagram illustrating various operations for applying the default beam rule in the beam behavior of the CSI-RS for the FeMIMO when the PDCCH and the CSI-RS have the same numerology and the PDCCH is configured with a non-SFN configuration, according to an embodiment as disclosed herein;

FIG. 10*a* is an example flow diagram illustrating various operations for applying the default beam rule in the beam behavior of the CSI-RS for the FeMIMO when the PDCCH and CSI-RS have different numerology and the PDCCH is configured with the SFN configuration, according to an embodiment as disclosed herein;

FIG. 10*b* is an example flow diagram illustrating various operations for applying the default beam rule in the beam behavior of the CSI-RS for the FeMIMO when the PDCCH and CSI-RS have different numerology and the PDCCH is configured with the SFN configuration, according to an embodiment as disclosed herein;

FIG. 11*b* is an example flow diagram illustrating various operations for applying the default beam rule in the beam behavior of the CSI-RS for the FeMIMO when the PDCCH and the CSI-RS have different numerology and the PDCCH is configured with the non-SFN configuration, according to an embodiment as disclosed herein.

MODE FOR THE INVENTION

Figure 3:
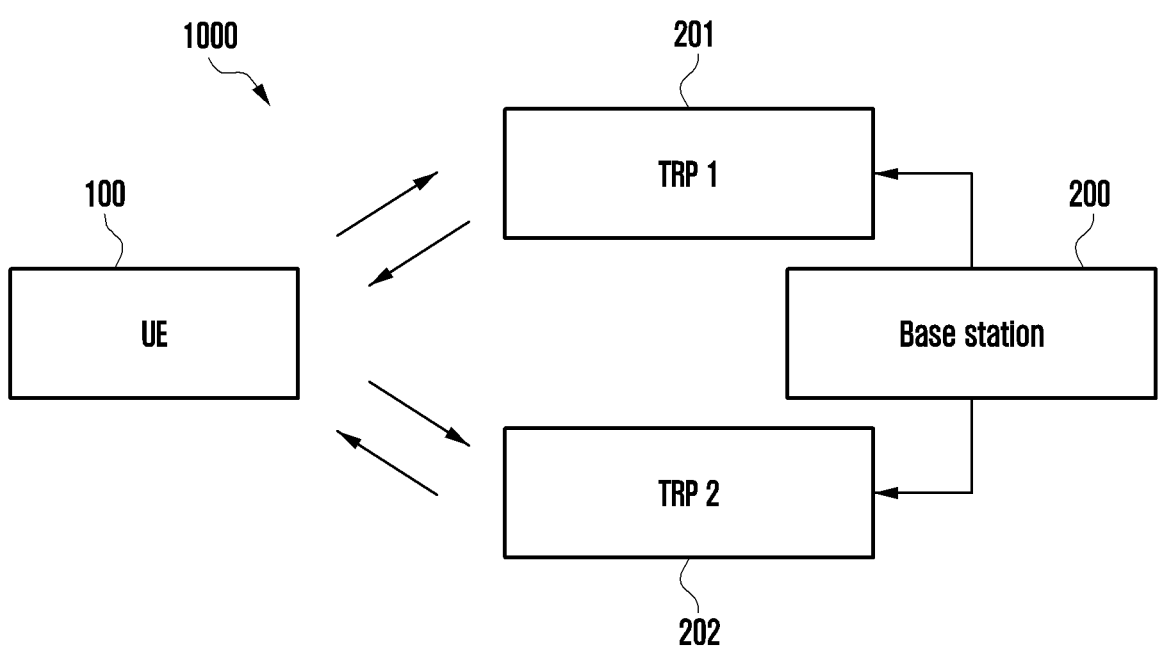
FIG. 3 illustrates an overview of a wireless network for beam behavior of CSI-RS for FeMIMO, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to achieve a method for beam behavior of CSI-RS for FeMIMO. The method includes sending, by a UE, UE capability information comprising a beamSwitchTiming to at least one BS. The beamSwitchTiming indicates a minimum number of OFDM symbols between a DCI triggering of aperiodic CSI-RS and aperiodic CSI-RS transmission. Further, the method includes receiving, by the UE, a PDCCH DCI for reception of the aperiodic CSI-RS from the at least one BS. Further, the method includes determining, by the UE, a default beam rule for reception of the aperiodic CSI-RS triggered by the DCI. Further, the method includes receiving, by the UE, the aperiodic CSI-RS from the at least one BS. Furthermore, the method includes processing, by the UE, the aperiodic CSI-RS by applying the default beam rule.

Referring now to the drawings and more particularly to FIGS. 3 to 11, where similar reference characters denote corresponding features consistently throughout the figures, there are shown preferred embodiments. This invention enables the BS 200 to apply a default beam rule when time offset between triggering DCI and received aperiodic CSI-RS is less than beamSwitchTiming.

FIG. 1*a* is an example illustration (10*a*) in which a SFN scheme for multi-TRP is depicted, according to prior art. For the SFN scheme, the environment is defined as follows. The control resource set (CORESET) used for PDCCH transmission is configured with more than one transmission configuration indication (TCI) state corresponding to different quasi co-location (QCL) parameters, where each PDCCH candidate of a monitored search space maps to at least one TCI state. Same PDCCH information is transmitted over the same time-frequency resource from each TRP. On reception of the PDCCH occasion, a UE performs channel estimation over the PDCCH demodulation reference signal (DMRS) port considering a combined QCL parameter with respect to the configured TCI states.

FIG. 1*b* is an example illustration (10*b*) in which a non-SFN scheme for the multi-TRP is depicted, according to prior art. For the non-SFN scheme, the environment is defined as follows. The PDCCH transmission is monitored over more than one search space each associated with the respective control resource set (CORESET) with different transmission configuration indication (TCI) state corresponding to different quasi co-location (QCL) parameters. The same PDCCH information is transmitted over multiple transmission occasions from each TRP in different time resources as time division multiplexing (TDM) or in different frequency resources as frequency division multiplexing (FDM). On reception of the PDCCH occasions from different search spaces, the UE performs channel estimation over the PDCCH demodulation reference signal (DMRS) port considering different QCL parameters over each occasion, with respect to the configured TCI states.

Figure 2:
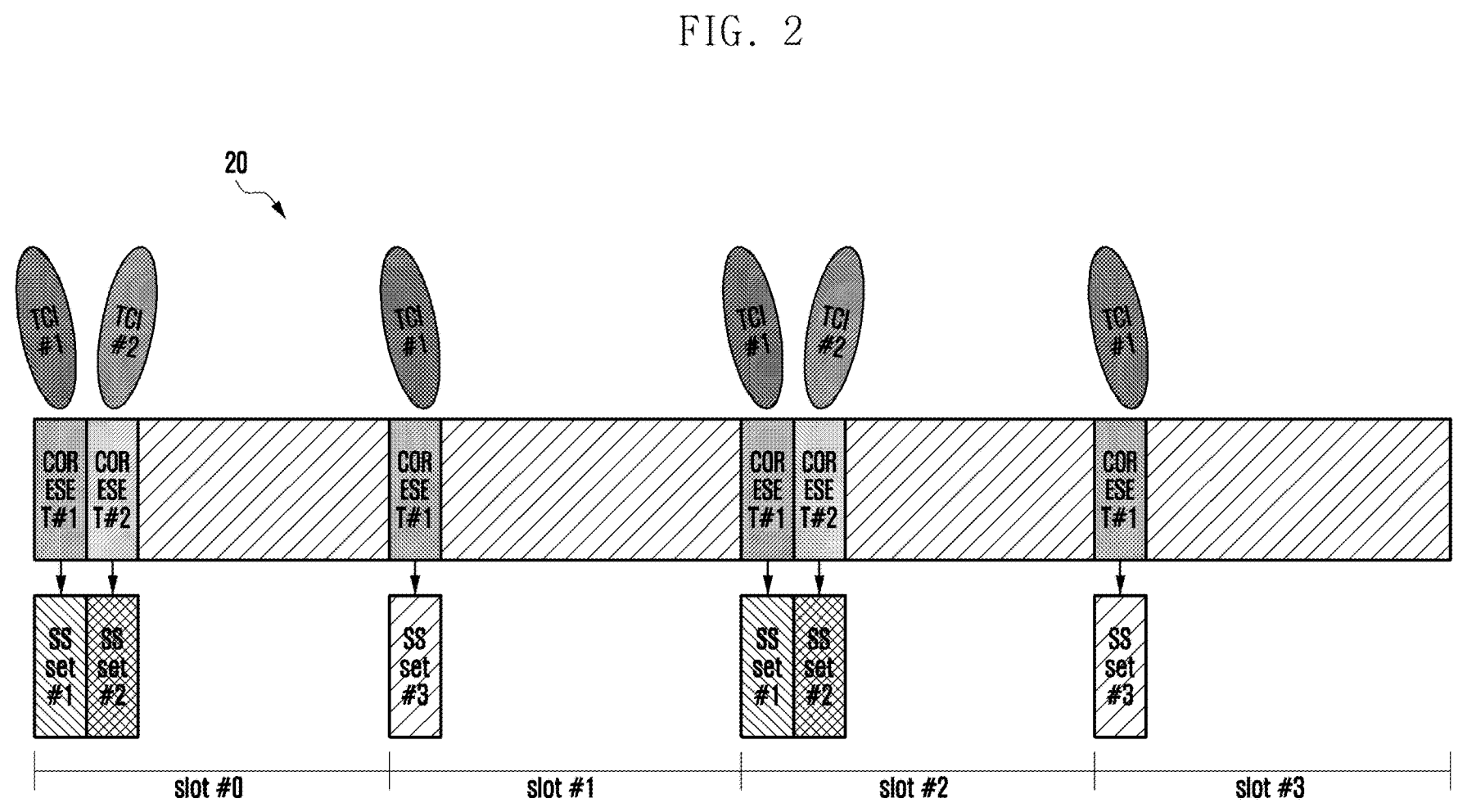

FIG. 2 is an example scenario in which multi-beam operation involving corset, search space and TCI are depicted, according to prior art. The BS can configure many TCI states to each CORESET which can be associated with a search space. The figure represents two CORESETS, each configured with a different TCI state.

FIG. 3 illustrates an overview of a wireless network (1000) for beam behavior of CSI-RS for FeMIMO, according to an embodiment as disclosed herein. The wireless network (1000) can be, for example, but not limited to a 5G network, a 6G network and an O-RAN network. In an embodiment, the wireless network (1000) includes a UE (100) and a base station (200). The BS 200 communicates to UE 100 (and vice versa) via two TRPs 201 and 202, called as transmission reception points. What is sent over the TRPs is controlled by the BS 200. In effect, the UE 100 interacts with BS 200 via TRPs 201,202. Each TRP can be configured to send same or different signals to the UE. The UE (100) can be, for example, but not limited to a laptop, a desktop computer, a notebook, a relay device, a Device-to-Device (D2D) device, a vehicle to everything (V2X) device, a smartphone, a tablet, an immersive device, a virtual reality device, and an internet of things (IoT) device.

The UE (100) is configured to send UE capability information including a beamSwitchTiming to the BS (200). The beamSwitchTiming indicates a minimum number of OFDM symbols between a DCI triggering of aperiodic CSI-RS and aperiodic CSI-RS transmission. In response to the beamSwitchTiming included in the UE capability information, the BS (200) is configured to send the PDCCH DCI for reception of the aperiodic CSI-RS to the UE (100). The UE (100) receives the PDCCH DCI for reception of the aperiodic CSI-RS from the BS (200). The UE (100) is configured to determine a default beam rule for reception of the aperiodic CSI-RS triggered by the DCI.

In an embodiment, the UE (100) is configured to determine that numerology of a PDCCH DCI is same as numerology of the aperiodic CSI-RS and a scheduling offset between a last symbol of the PDCCH carrying the triggering DCI and a first symbol of the aperiodic CSI-RS is smaller than the beamSwitchTiming. Further, the UE (100) is configured to determine whether the PDCCH is configured with a SFN configuration or a non-SFN configuration. In response to determining that the PDCCH is configured with the SFN configuration, the UE (100) is configured to determine the default beam rule based on the SFN configuration.

The default beam rule determined based on the SFN configuration is explained in below:

In an embodiment, the UE (100) is configured to determine whether one of a DL signal with an indicated TCI state in same symbols as the aperiodic CSI-RS, one or more CORESET configured for an active BWP of the serving cell of the BS (200) in which the aperiodic CSI-RS is received, the UE (100) is configured with enableDefaultBeamForCCS. The UE (100) is configured to determine the default beam rule by applying a QCL assumption of the DL signal upon receiving the aperiodic CSI-RS at the UE (100), in response to determining the DL signal with the indicated TCI state in same symbols as the aperiodic CSI-RS. The DL signal comprises at least one of the PDSCH scheduled with an offset larger than or equal to the threshold timeDurationForQCL assumption, or the aperiodic CSI-RS scheduled with an offset larger than or equal to the beamSwitchTiming reported by the UE (100) or a periodic CSI-RS or a semi-persistent CSI-RS.

Alternatively, the UE (100) is configured to determine the default beam rule by applying a QCL assumption, upon receiving the aperiodic CSI-RS, in a latest slot in which the one or more CORESETs within the active BWP of the serving cell are monitored based on the one or more CORESET configured with more than one TCI state through PDCCH MAC-CE to support the SFN configuration for the PDCCH, in response to determining the one or more CORESET configured for the active BWP in which the aperiodic CSI-RS is received.

Alternatively, the UE (100) is configured to determine the default beam rule by applying the QCL assumption corresponding to the lowest-ID activated TCI state applicable to the PDSCH within the active BWP of the serving cell of the BS (200) in which the CSI-RS is to be received, in response to determining the UE (100) is configured with enableDefaultBeamFor CSS.

In an embodiment, the QCL assumption is applied by at least one of applying the QCL assumption corresponding to a lowest TCI state Identifier (ID) used for a PDCCH quasi co-location indication of the CORESET associated with a monitored search space with a lowest control Resource Set ID, applying the QCL assumption corresponding to a highest TCI state ID used for a PDCCH quasi co-location indication of the CORESET associated with a monitored search space with a lowest control Resource Set ID, applying the QCL assumption corresponding to a first TCI state ID used for a PDCCH quasi co-location indication of the CORESET associated with a monitored search space with a lowest control Resource Set ID, applying the QCL assumption corresponding to a last TCI state ID used for a PDCCH quasi co-location indication of the CORESET associated with a monitored search space with a lowest control Resource Set ID, applying the QCL assumption used for the o CORESET associated with a monitored search space with the lowest control Resource Set ID, configured with a single TCI state, and applying the QCL assumption used for the CORESET associated with a monitored search space with a lowest control Resource Set ID, where the QCL assumption is a combination of QCL parameters corresponding to the TCI states configured for the CORESET.

In response to determining that the PDCCH is configured with the non-SFN configuration, the UE (100) is configured to determine the default beam rule based on the non-SFN configuration. The determination of the default beam rule based on the non-SFN configuration is explained below:

In an embodiment, the UE (100) is configured to determine whether one of a DL signal with an indicated TCI state in same symbols as the aperiodic CSI-RS, one or more CORESET configured for an active BWP of the serving cell of the BS (200) in which the aperiodic CSI-RS is received, the UE (100) is configured with enableDefaultBeam- ForCCS. The UE (100) is configured to determine the default beam rule by applying a QCL assumption of the DL signal upon receiving the aperiodic CSI-RS at the UE (100), in response to determining the DL signal with the indicated TCI state in same symbols as the aperiodic CSI-RS. The DL signal comprises at least one of the PDSCH scheduled with an offset larger than or equal to a threshold timeDuration-ForQCL, or, aperiodic CSI-RS scheduled with an offset larger than or equal to the beamSwitchTiming reported by the UE (100) or a periodic CSI-RS, or a semipersistent CSI-RS. In another embodiment, the UE (100) is configured to determine the default beam rule by applying the QCL assumption, upon receiving the aperiodic CSI-RS, in a latest slot in which the one or more CORESETs within the active BWP of the serving cell are monitored, in response to determining the one or more CORESET configured for the BWP in which the aperiodic CSI-RS is received.

In another embodiment, the UE (100) is configured to determine the default beam rule by applying the QCL assumption corresponding to a lowest-ID activated TCI state applicable to the PDSCH within the active BWP of the serving cell of the BS (200) in which the CSI-RS is to be received, in response to determining the UE (100) is configured with enableDefaultBeamForCCS.

In an embodiment, the QCL assumption is applied by at least one of applying the QCL assumption used for the CORESET associated with the monitored search space with a lowest control Resource Set ID, and applying the QCL assumption used for the CORESET associated with the monitored search space with a lowest control Resource Set ID combined with the QCL assumption of any CORESET linked with the CORESET with the lowest control Resource Set ID for the PDCCH repetition.

In another embodiment, the UE (100) is configured to determine that the numerology of the PDCCH DCI is different than the numerology of the aperiodic CSI-RS and the scheduling offset between the last symbol of the PDCCH carrying the triggering DCI and the first symbol of the aperiodic CSI-RS is smaller than the beamSwitchTiming plus the functional value. The functional value is determined using the beam switching timing delay, subcarrier spacing configurations of CSI-RS and PDCCH in CSI-RS symbols reported by the UE (100). The functional value corresponds to $d \cdot 2^{\mu CSIRS}/2^{\mu PDCCH}$, where μCSI-RS and μPDCCH are subcarrier spacing configurations of CSI-RS and PDCCH respectively, where subcarrier spacing for CSI-RS is 15 KHz*$2^{\mu CSI\text{-}RS}$ and subcarrier spacing configuration for PDCCH is 15 KHz*$2^{\mu PDCCH}$ where * denotes multiplication. Here d is as per a Table given later if $\mu_{PDCCH} < \mu_{CSI\text{-}RS}$ else it is 0. Further, the UE (100) is configured to determine whether the PDCCH is configured with a SFN configuration or non-SFN configuration. Further, the UE (100) is configured to determine the default beam rule based on the SFN configuration in response to determining that the PDCCH is configured with the SFN configuration.

In an embodiment, the UE (100) is configured to determine whether one of a DL signal with an indicated TCI state in same symbols as the aperiodic CSI-RS, one or more CORESET configured for an active BWP of the serving cell of the BS (200) in which the aperiodic CSI-RS is received, the UE (100) is configured with enableDefaultBeamForCCS. Further, the UE (100) is configured to determine the default beam rule by applying the QCL assumption of the DL signal upon receiving the aperiodic CSI-RS at the UE (100), in response to determining the DL signal with the indicated TCI state in same symbols as the aperiodic CSI-RS. The DL signal comprises at least one of the PDSCH scheduled with an offset larger than or equal to a threshold timeDurationForQCL, or aperiodic CSI-RS scheduled with an offset larger than or equal to the beamSwitchTiming plus the functional value. The functional value is determined using a beam switching timing delay, subcarrier spacing configurations of CSI-RS and PDCCH in CSI-RS symbols reported by the UE (100) or a periodic CSI-RS, or a semipersistent CSI-RS. The functional value corresponds to $d \cdot 2^{\mu CSIRS}/2^{\mu PDCCH}$, where μCSIRS and μPDCCH are subcarrier spacing configurations of CSI-RS and PDCCH respectively, where subcarrier spacing for CSI-RS is 15 KHz*$2^{\mu CSIRS}$ and subcarrier spacing configuration for PDCCH is 15 KHz*$2^{\mu PDCCH}$ where * denotes multiplication.

In another embodiment, the UE (100) is configured to determine the default beam rule by applying a QCL assumption, upon receiving the aperiodic CSI-RS, in a latest slot in which the one or more CORESETs within the active BWP of the serving cell are monitored based on the one or more CORESET configured with more than one TCI state through PDCCH MAC-CE to support the SFN configuration for the PDCCH, in response to determining the one or more CORESET configured for the active BWP in which the aperiodic CSI-RS is received.

In another embodiment, the UE (100) is configured to determine the default beam rule by applying the QCL assumption corresponding to a lowest-ID activated TCI state applicable to the PDSCH within the active BWP of the serving cell of the BS (200) in which the CSI-RS is to be received, in response to determining the UE (100) is configured with enableDefaultBeamForCCS.

In an embodiment, the QCL assumption is applied by at least one of applying the QCL assumption corresponding to a lowest TCI state ID used for a PDCCH quasi colocation indication of the CORESET associated with a monitored search space with a lowest control Resource Set ID, applying the QCL assumption corresponding to a highest TCI state ID used for a PDCCH quasi co-location indication of the CORESET associated with a monitored search space with a lowest control Resource Set ID, applying the QCL assumption corresponding to a first TCI state ID used for a PDCCH quasi co-location indication of the CORESET associated with a monitored search space with a lowest control Resource Set ID, applying the QCL assumption corresponding to a last TCI state ID used for a PDCCH quasi co-location indication of the CORESET associated with a monitored search space with a lowest control Resource Set ID, applying the QCL assumption used for the CORESET associated with a monitored search space with the lowest control Resource Set ID, configured with a single TCI state, and applying the QCL assumption used for the CORESET associated with a monitored search space with a lowest control Resource Set ID, wherein the QCL assumption is a combination of QCL parameters corresponding to the TCI state configured for the one or more CORESET.

In another embodiment, the UE (100) is configured to determine the default beam rule based on the non-SFN configuration in response to determining that the PDCCH is configured with the non-SFN configuration. The determination of the default beam rule based on the non-SFN configuration is explained below:

In an embodiment, the UE (100) is configured to determine whether one of the DL signal with the indicated TCI state in same symbols as the aperiodic CSI-RS, one or more CORESET configured for the active BWP of the serving cell of the BS (200) in which the aperiodic CSI-RS is received, the UE (100) is configured with enableDefaultBeamForCCS. Further, the UE (100) is configured to determine the default beam rule by applying the QCL assumption of the DL signal upon receiving the aperiodic CSI-RS at the UE, in response to determining the DL signal with the indicated TCI state in same symbols as the aperiodic CSI-RS. The DL signal refers to the PDSCH scheduled with an offset larger than or equal to the threshold timeDuration-ForQCL, or the aperiodic CSI-RS scheduled with an offset larger than or equal to the beamSwitchTiming plus a functional value. The functional value is determined using the beam switching timing delay, the subcarrier spacing configurations of CSI-RS and PDCCH CSI-RS symbols or the periodic CSI-RS, and the semi-persistent CSI-RS.

In another embodiment, the UE (100) is configured to determine the default beam rule by applying the QCL assumption, upon receiving the aperiodic CSI-RS, in a latest slot in which the one or more CORESETs within the active BWP of the serving cell are monitored, in response to determining the one or more CORESET configured for the active BWP of the serving cell of the BS (200) in which the aperiodic CSI-RS is received. In another embodiment, the UE (100) is configured to determine the default beam rule by applying the QCL assumption corresponding to a lowest-ID activated TCI state applicable to the PDSCH within the active BWP of the serving cell of the BS (200) in which the CSI-RS is to be received, in response to determining the UE (100) is configured with enableDefaultBeamForCCS.

In another embodiment, the QCL assumption is applied by at least one of applying the QCL assumption used for CORESETassociated with the monitored search space with a lowest control Resource Set ID, and applying the QCL assumption used for the CORESET associated with the monitored search space with a lowest control Resource Set ID combined with the QCL assumption of any CORESET linked with the CORESET with the lowest control Resource Set ID for the PDCCH repetition.

Further, the UE (100) is configured to receive the aperiodic CSI-RS from the BS (200). Based on the default beam rule, the UE (100) is configured to process the aperiodic CSI-RS by applying the default beam rule.

Figure 4:
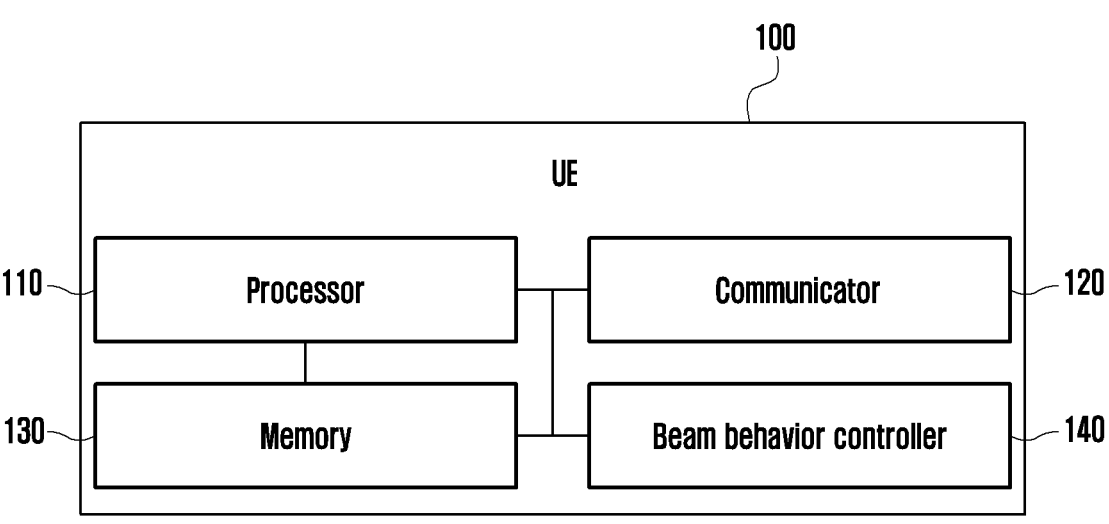
FIG. 4 shows various hardware components of a UE, according to an embodiment as disclosed herein.

FIG. 4 shows various hardware components of the UE (100), according to an embodiment as disclosed herein. In an embodiment, the UE (100) includes a processor (110), a communicator (120), a memory (130), and a beam behavior controller (140). The processor (110) is coupled with the communicator (120), the memory (130) and the beam behavior controller (140).

The beam behavior controller (140) is configured to send the UE capability information comprising the beamSwitch-Timing to the BS (200). In response to the UE capability information comprising the beamSwitchTiming, the beam behavior controller (140) is configured to receive the PDCCH DCI for reception of the aperiodic CSI-RS from the BS (200). Further, the beam behavior controller (140) is configured to determine the default beam rule for reception of the aperiodic CSI-RS triggered by the DCI.

In an embodiment, the beam behavior controller (140) is configured to determine that the numerology of the PDCCH DCI is same as the numerology of the aperiodic CSI-RS and the scheduling offset between the last symbol of the PDCCH carrying the triggering DCI and the first symbol of the aperiodic CSI-RS is smaller than the beamSwitchTiming. Further, the beam behavior controller (140) is configured to determine whether the PDCCH is configured with the SFN configuration or the non-SFN configuration. In response to determining that the PDCCH is configured with the SFN configuration, the beam behavior controller (140) is configured to determine the default beam rule based on the SFN configuration.

In an embodiment, the beam behavior controller (140) is configured to determine whether one of the DL signal with the indicated TCI state in same symbols as the aperiodic CSI-RS, one or more CORESET configured for the active BWP of the serving cell of the BS (200) in which the aperiodic CSI-RS is received, the UE (100) is configured with enableDefaultBeamForCCS. Further, the beam behavior controller (140) is configured to determine the default beam rule by applying the QCL assumption of the DL signal upon receiving the aperiodic CSI-RS at the UE (100), in response to determining the DL signal with the indicated TCI state in same symbols as the aperiodic CSI-RS.

Alternatively, the beam behavior controller (140) is configured to determine the default beam rule by applying the QCL assumption, upon receiving the aperiodic CSI-RS, in a latest slot in which the one or more CORESETs within the active BWP of the serving cell are monitored based on the CORESET configured with more than one TCI state through PDCCH MAC-CE to support the SFN configuration for the PDCCH, in response to determining the one or more CORE-SET configured for the active BWP in which the aperiodic CSI-RS is received.

Alternatively, the beam behavior controller (140) is configured to determine the default beam rule by applying the QCL assumption corresponding to a lowest-ID activated TCI state applicable to the PDSCH within the active BWP of the serving cell of the BS (200) in which the CSI-RS is to be received, in response to determining the UE (100) is configured with enableDefaultBeamFor CSS.

In response to determining that the PDCCH is configured with the non-SFN configuration, the beam behavior controller (140) is configured to determine the default beam rule based on the non-SFN configuration.

In an embodiment, the beam behavior controller (140) is configured to determine whether one of the DL signal with the indicated TCI state in same symbols as the aperiodic CSI-RS, one or more CORESET configured for the active BWP of the serving cell of the BS (200) in which the aperiodic CSI-RS is received, the UE (100) is configured with enableDefaultBeamForCCS. The beam behavior controller (140) is configured to determine the default beam rule by applying the QCL assumption of the DL signal upon receiving the aperiodic CSI-RS at the UE (100), in response to determining the DL signal with the indicated TCI state in same symbols as the aperiodic CSI-RS.

In another embodiment, the beam behavior controller (140) is configured to determine the default beam rule by applying the QCL assumption, upon receiving the aperiodic CSI-RS, in a latest slot in which the one or more CORESETs within the active BWP of the serving cell are monitored, in response to determining the one or more CORESET configured for the BWP in which the aperiodic CSI-RS is received. In another embodiment, the beam behavior controller (140) is configured to determine the default beam rule by applying the QCL assumption corresponding to the lowest-ID activated TCI state applicable to the PDSCH within the active BWP of the serving cell of the BS (200) in which the CSI-RS is to be received, in response to determining the UE (100) is configured with enableDefaultBeam-ForCCS.

In another embodiment, the beam behavior controller (140) is configured to determine that the numerology of the PDCCH DCI is different than the numerology of the aperiodic CSI-RS and the scheduling offset between the last symbol of the PDCCH carrying the triggering DCI and the first symbol of the aperiodic CSI-RS is smaller than the beamSwitchTiming with the functional value. Further, the beam behavior controller (140) is configured to determine whether the PDCCH is configured with the SFN configuration or the non-SFN configuration. Further, the beam behavior controller (140) is configured to determine the default beam rule based on the SFN configuration in response to determining that the PDCCH is configured with the SFN configuration.

In an embodiment, the beam behavior controller (140) is configured to determine whether one of the DL signal with the indicated TCI state in same symbols as the aperiodic CSI-RS, one or more CORESET configured for the active BWP of the serving cell of the BS (200) in which the aperiodic CSI-RS is received, the UE (100) is configured with enableDefaultBeamForCCS. Further, the beam behavior controller (140) is configured to determine the default beam rule by applying the QCL assumption of the DL signal upon receiving the aperiodic CSI-RS at the UE (100), in response to determining the DL signal with the indicated TCI state in same symbols as the aperiodic CSI-RS.

In another embodiment, the beam behavior controller (140) is configured to determine the default beam rule by applying the QCL assumption, upon receiving the aperiodic CSI-RS, in a latest slot in which the one or more CORESETs within the active BWP of the serving cell are monitored based on the one or more CORESET configured with more than one TCI state through PDCCH MAC-CE to support the SFN configuration for the PDCCH, in response to determining the one or more CORESET configured for the active BWP in which the aperiodic CSI-RS is received. In another embodiment, the beam behavior controller (140) is configured to determine the default beam rule by applying the QCL assumption corresponding to the lowest-ID activated TCI state applicable to the PDSCH within the active BWP of the serving cell of the BS (200) in which the CSI-RS is to be received, in response to determining the UE (100) is configured with enableDefaultBeamForCCS.

In another embodiment, the beam behavior controller (140) is configured to determine the default beam rule based on the non-SFN configuration in response to determining that the PDCCH is configured with the non-SFN configuration.

In an embodiment, the beam behavior controller (140) is configured to determine whether one of the DL signal with the indicated TCI state in same symbols as the aperiodic CSI-RS, one or more CORESET configured for the active BWP of the serving cell of the BS (200) in which the aperiodic CSI-RS is received, the UE (100) is configured with enableDefaultBeamForCCS. Further, the beam behavior controller (140) is configured to determine the default beam rule by applying the QCL assumption of the DL signal upon receiving the aperiodic CSI-RS at the UE, in response to determining the DL signal with the indicated TCI state in same symbols as the aperiodic CSI-RS. In another embodiment, the beam behavior controller (140) is configured to determine the default beam rule by applying the QCL assumption, upon receiving the aperiodic CSI-RS, in the latest slot in which the one or more CORESETs within the active BWP of the serving cell are monitored, in response to determining the one or more CORESET configured for the active BWP of the serving cell of the BS (200) in which the aperiodic CSI-RS is received. In another embodiment, the beam behavior controller (140) is configured to determine the default beam rule by applying the QCL assumption corresponding to the lowest-ID activated TCI state applicable to the PDSCH within the active BWP of the serving cell of the BS (200) in which the CSI-RS is to be received, in response to determining the UE (100) is configured with enableDefaultBeamForCCS.

Further, the beam behavior controller (140) is configured to receive the aperiodic CSI-RS from the BS (200). Based on the default beam rule, the beam behavior controller (140) is configured to process the aperiodic CSI-RS by applying the default beam rule.

The beam behavior controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 4 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 5 is an example flow chart (S500) illustrating a method for beam behavior of CSI-RS for FeMIMO, according to an embodiment as disclosed herein. The operations (S502-S510) are performed by the beam behavior controller (140).

At S502, the method includes sending the UE capability information comprising the beamSwitchTiming to the BS (200). The beamSwitchTiming indicates the minimum number of OFDM symbols between the DCI triggering of aperiodic CSI-RS and aperiodic CSI-RS transmission. At S504, the method includes receiving the PDCCH DCI for reception of the aperiodic CSI-RS from the BS (200). At S506, the method includes determining the default beam rule for reception of the aperiodic CSI-RS triggered by the DCI. At S508, the method includes receiving the aperiodic CSI-RS from the BS (200). At S510, the method includes processing the aperiodic CSI-RS by applying the default beam rule.

Figure 6:
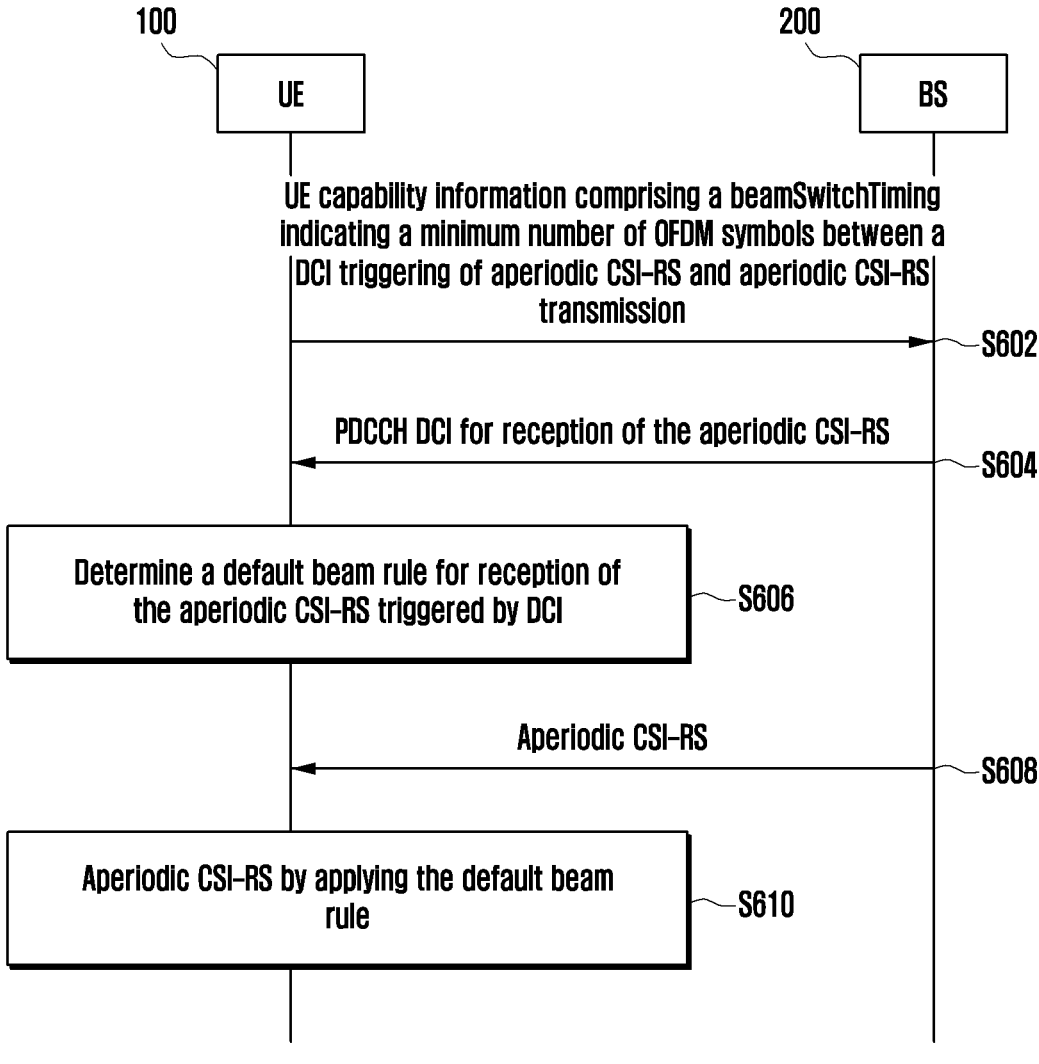
FIG. 6 is an example sequence diagram illustrating the method for the beam behavior of the CSI-RS for the FeMIMO, according to an embodiment as disclosed herein.

FIG. 6 is an example sequence diagram illustrating a method for the beam behavior of CSI-RS for the FeMIMO, according to an embodiment as disclosed herein.

At S602, the UE (100) sends the UE capability information including the beamSwitchTiming to the BS (200). At S604, the BS (200) sends the PDCCH DCI for reception of the aperiodic CSI-RS to the UE (100) in response to the beamSwitchTiming. The UE (100) receives the PDCCH DCI for reception of the aperiodic CSI-RS from the BS (200). At S606, the UE (100) determines the default beam rule for reception of the aperiodic CSI-RS triggered by the DCI. At S608, the BS (200) sends the aperiodic CSI-RS to the UE (100). The UE (100) receives the aperiodic CSI-RS from the BS (200). At S610, the UE (100) processes the aperiodic CSI-RS by applying the default beam rule.

Figure 7:
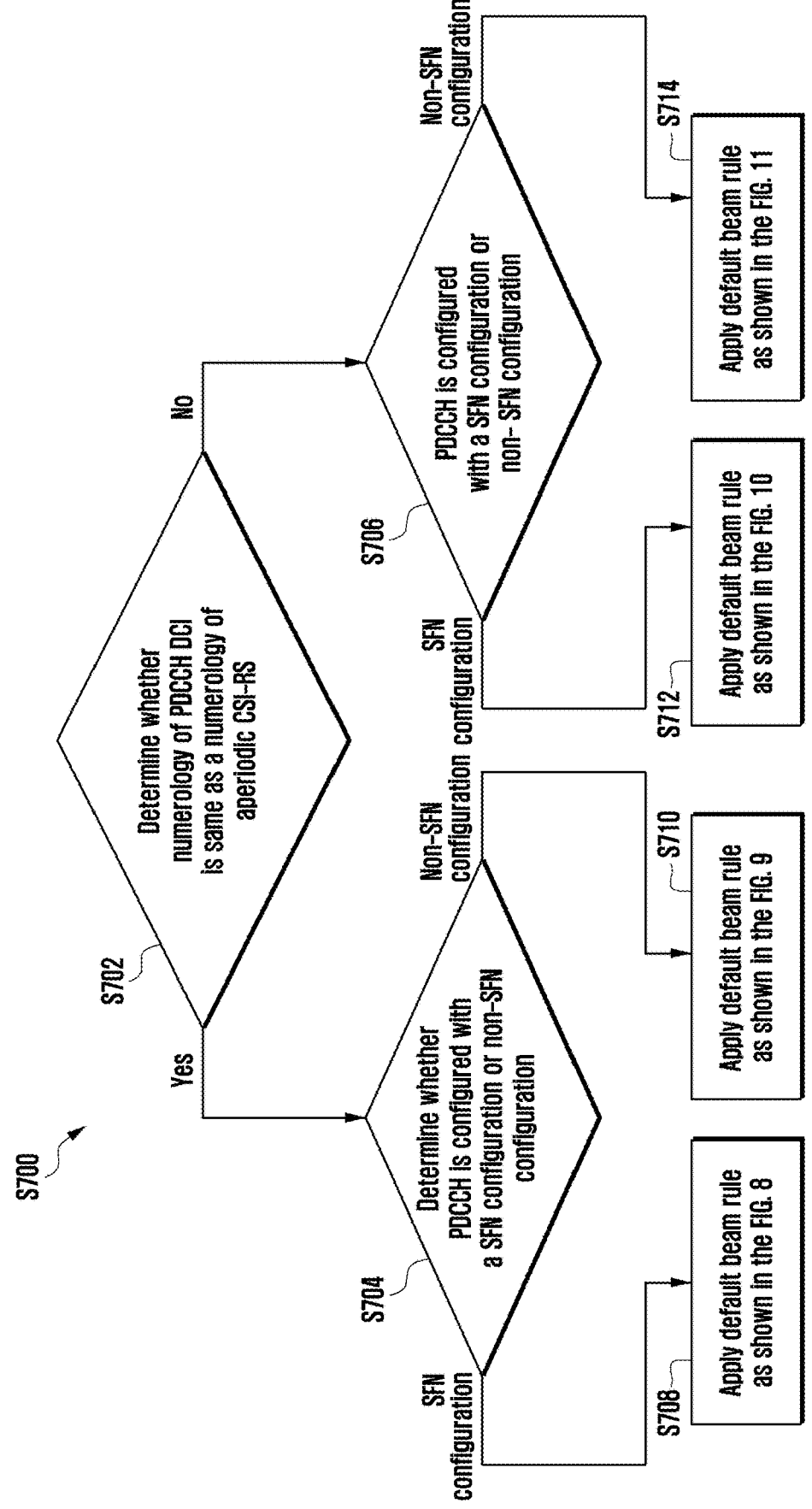
FIG. 7 is an example flow diagram illustrating various operations for determining a default beam rule explained in conjugation with the FIG. 8 to FIG. 11, according to an embodiment as disclosed herein.

FIG. 7 is an example flow diagram (S700) illustrating various operations for determining the default beam rule explained in conjugation with the FIG. 8 to FIG. 11, according to an embodiment as disclosed herein.

As shown in the FIG. 7, at S702, the method includes determining whether the numerology of PDCCH DCI is same as the numerology of aperiodic CSI-RS. In response to determining that the numerology of PDCCH DCI is same as the numerology of aperiodic CSI-RS then, at S704, the method includes determining whether the PDCCH is configured with the SFN configuration or the non-SFN configuration. In response to determining that the numerology of PDCCH DCI is not same as the numerology of aperiodic CSI-RS then, at S706, the method includes determining whether the PDCCH is configured with the SFN configuration or the non-SFN configuration. In response to that the PDCCH is configured with the SFN configuration then, at S708, the method includes applying the default beam rule as shown in the FIGS. 8a and 8b. In response to that the PDCCH is configured with the non-SFN configuration then, at S710, the method includes applying the default beam rule as shown in the FIGS. 9a and 9b. In response to that the PDCCH is configured with the SFN configuration then, at S712, the method includes applying the default beam rule as shown in the FIGS. 10a and 10b. In response to that the PDCCH is configured with the non-SFN configuration then, at S714, the method includes applying the default beam rule as shown in the FIGS. 11a and 11b.

Figure 8A:
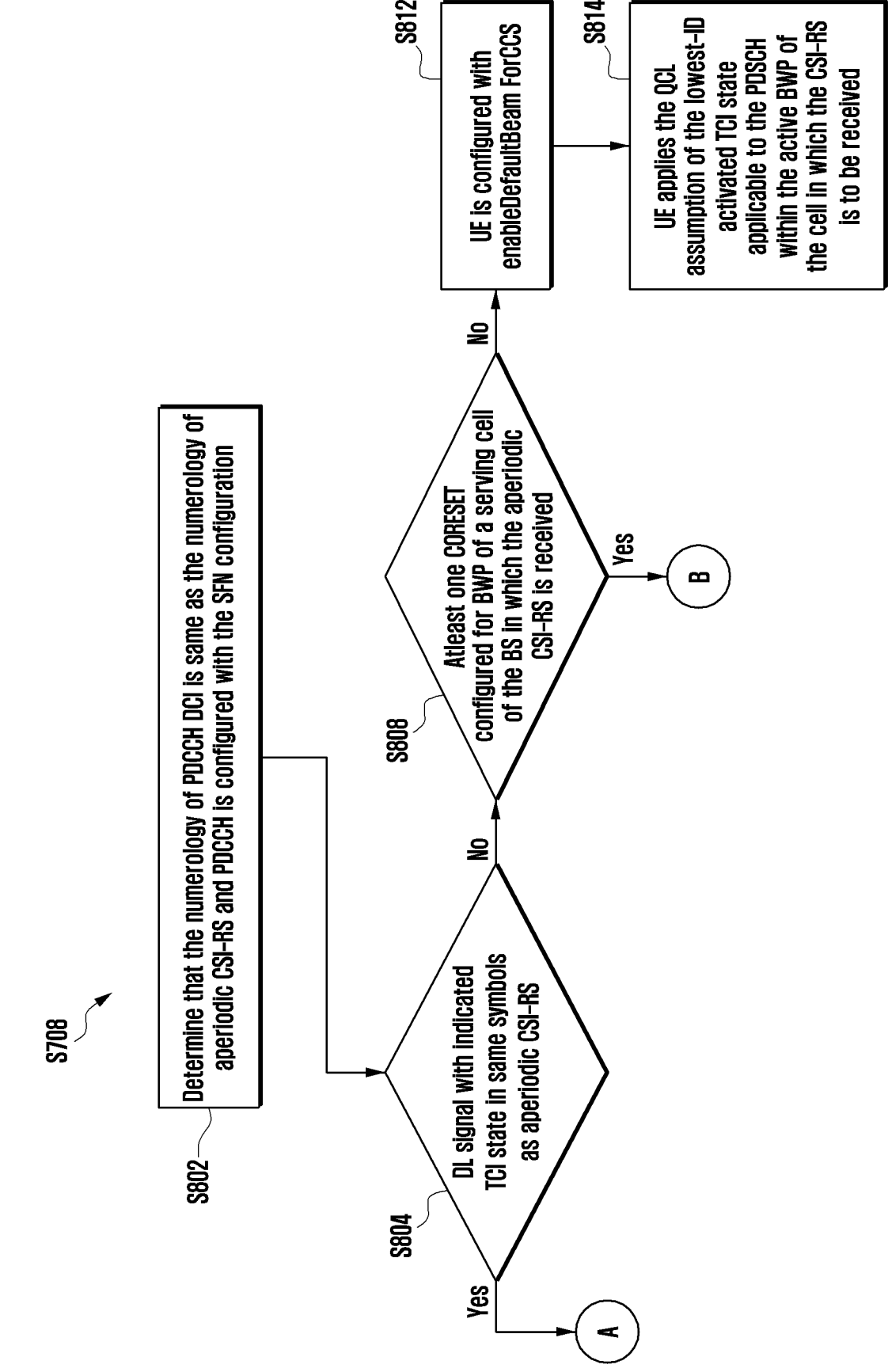
FIG. 8*a* is an example flow diagram illustrating various operations for applying the default beam rule in the beam behavior of the CSI-RS for the FeMIMO when a numerology of a PDCCH DCI is same as a numerology of aperiodic CSI-RS and a PDCCH is configured with a SFN configuration, according to an embodiment as disclosed herein.

FIGS. 8a and 8b are example flow diagram (S708) illustrating various operations for applying the default beam rule in the beam behavior of the CSI-RS for the FeMIMO when the numerology of PDCCH DCI is same as the numerology of aperiodic CSI-RS and PDCCH is configured with the SFN configuration, according to an embodiment as disclosed herein.

As shown in the FIGS. 8a and 8b, at S802, the UE (100) determines that the numerology of the PDCCH DCI is same as the numerology of aperiodic CSI-RS and the PDCCH is configured with the SFN configuration. At S804, the UE (100) determines whether the DL signal with indicated TCI state is in same symbols as aperiodic CSI-RS. If the DL signal with indicated TCI state is not in same symbols as aperiodic CSI-RS then, at S808, the UE (100) determines whether at least one CORESET configured for the BWP of the serving cell of the BS (200) in which the aperiodic CSI-RS is received. In response to not determining that the CORESET configured for the BWP of the serving cell of the BS (200) in which the aperiodic CSI-RS is received then, at S812, the UE (100) is configured with the enableDefaultBeamForCCS. If the scheduling offset between the last symbol of the PDCCH carrying the triggering DCI and the first symbol of the aperiodic CSI-RS resources in a NZP-CSI-RS-ResourceSet configured without higher layer parameter trs-Info is smaller than the UE reported threshold beamSwitchTiming, as defined in [13, TS 38.306], when the reported value is one of the values of {14, 28, 48} and enableBeamSwitchTiming-r16 is not provided, or is smaller than 48 when the reported value of beamSwitchTiming-r16 is one of the values of {224, 336} and enableBeamSwitchTiming-r16 is provided.

1. Scenario 1: At S806, if there is any other DL signal with the indicated TCI state in the same symbols as the CSI-RS, at S806, the UE (100) applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming when the reported value is one of the values {14,28,48} and enableBeamSwitchTiming-r16 is not provided, aperiodic CSI-RS scheduled with offset larger than or equal to 48 when the reported value of beamSwitchTiming-r16 is one of the values {224, 336} and enableBeamSwitchTiming-r16 is provided, periodic CSI-RS, semi-persistent CSI-RS.

2. Scenario 2: In response to determining that at least one CORESET configured for the BWP of the serving cell of the BS (200) in which the aperiodic CSI-RS is received then, at S 810, if at least one CORESET is configured for the BWP in which the aperiodic CSI-RS is received, at least one CORESET is configured with more than one TCI state though PDCCH MAC-CE activation to support 'SFN Scheme' for PDCCH, when receiving the aperiodic CSI-RS, the UE (100) applies the QCL assumption based on one or more of the solutions/options listed below, in the latest slot in which one or more CORESETs within the active BWP of the serving cell are monitored;

a) Option 1-1: QCL assumption corresponding to the lowest TCI state ID used for PDCCH quasi co-location indication of the CORESET associated with a monitored search space with the lowest controlResourceSetId.

b) Option 1-2: QCL assumption corresponding to the highest TCI state ID used for PDCCH quasi co-location indication of the CORESET associated with a monitored search space with the lowest controlResourceSetId.

c) Option 1-3: QCL assumption corresponding to the first TCI state ID used for PDCCH quasi co-location indication of the CORESET associated with a monitored search space with the lowest controlResourceSetId.

d) Option 1-4: QCL assumption corresponding to the last TCI state ID used for PDCCH quasi co-location indication of the CORESET associated with a monitored search space with the lowest controlResourceSetId.

e) Option 2: QCL assumption used for the CORESET associated with a monitored search space with the lowest controlResourceSetId, configured with a single TCI state.

f) Option 3: QCL assumption used for the CORESET associated with a monitored search space with the lowest controlResourceSetId; where the QCL assumption is a combination of the QCL parameters corresponding to the TCI states configured for the CORESET.

3. Scenario 3: At S814, else if the UE (100) is configured with [enableDefaultBeamForCCS] and when receiving the aperiodic CSI-RS, the UE (100) applies the QCL assumption of the lowest-ID activated TCI state applicable to the PDSCH within the active BWP of the cell in which the CSI-RS is to be received.

Figure 9A:
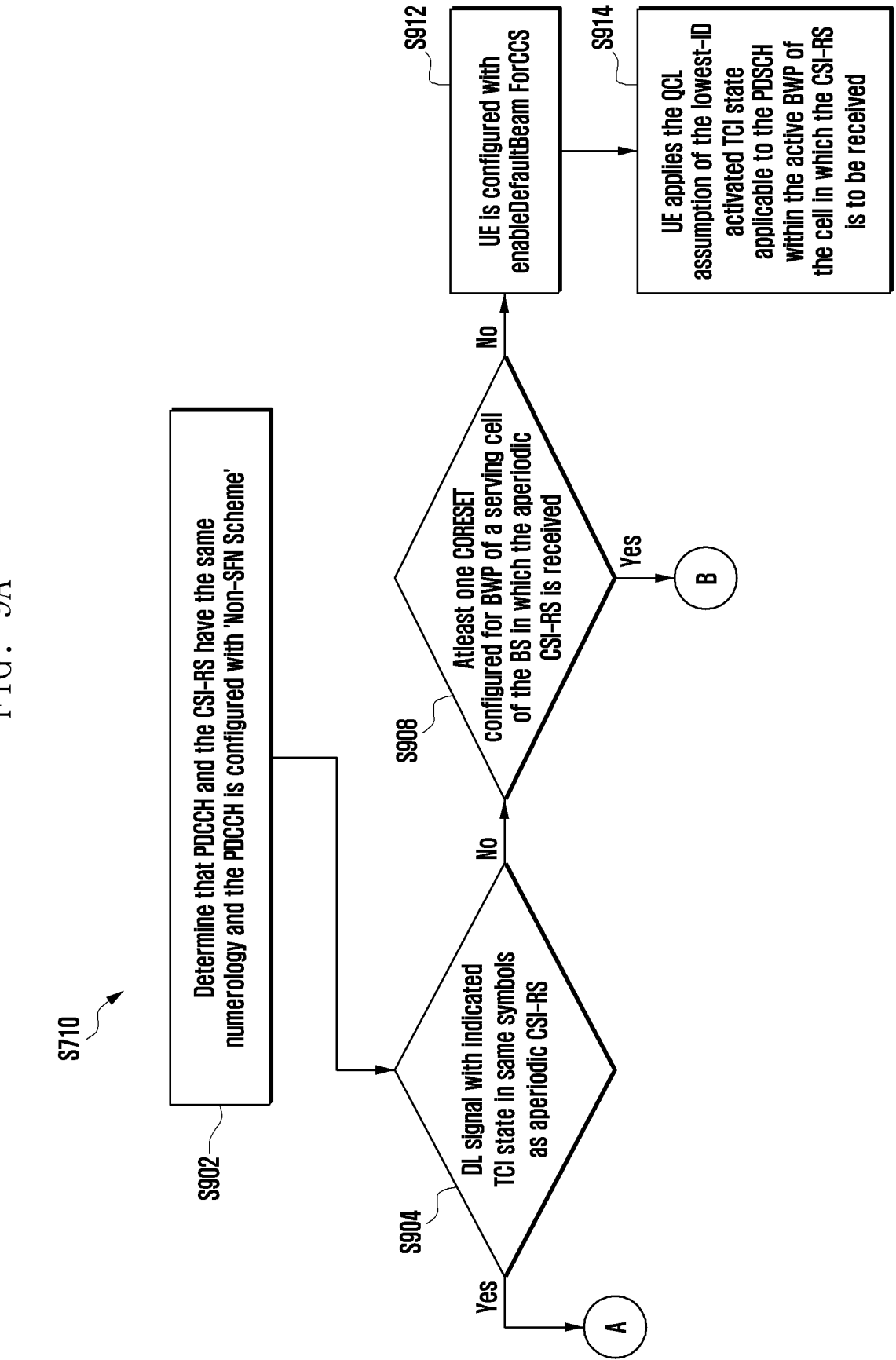
FIG. 9*a* is an example flow diagram illustrating various operations for applying the default beam rule in the beam behavior of the CSI-RS for the FeMIMO when the PDCCH and the CSI-RS have the same numerology and the PDCCH is configured with a non-SFN configuration, according to an embodiment as disclosed herein.

FIGS. 9a and 9b are example flow diagram (S710) illustrating various operations for applying the default beam rule in the beam behavior of the CSI-RS for the FeMIMO when the PDCCH and the CSI-RS have the same numerology and the PDCCH is configured with the non-SFN configuration, according to an embodiment as disclosed herein.

As shown in the FIGS. 9a and 9b, the procedure defines the default beam behavior of Aperiodic CSI-RS, when the triggering PDCCH and the CSI-RS have the same numerology and the PDCCH is configured with 'Non-SFN Scheme'. The procedure specifically provides multiple solutions/options for the scenario 2, where the CSI-RS is QCLed with a CORESET configured in the active BWP. If the scheduling offset between the last symbol of the PDCCH carrying the triggering DCI and the first symbol of the aperiodic CSI-RS resources in a NZP-CSI-RS-ResourceSet configured without higher layer parameter trs-Info is smaller than the UE reported threshold beamSwitchTiming, as defined in [13, TS 38.306], when the reported value is one of the values of {14, 28, 48} and enableBeamSwitchTiming-r16 is not provided, or is smaller than 48 when the reported value of beamSwitchTiming-r16 is one of the values of {224, 336} and enableBeamSwitchTiming-r16 is provided.

At S902, the UE (100) determines that the PDCCH and the CSI-RS have the same numerology and the PDCCH is configured with the non-SFN configuration. At S904, the UE (100) determines that the DL signal with the indicated TCI state is in same symbols as aperiodic CSI-RS. In response to the DL signal with the indicated TCI state is not in same symbols as aperiodic CSI-RS then, at S908, the UE (100) determines that atleast one CORESET configured for BWP of the serving cell of the BS (200) in which the aperiodic CSI-RS is received. In response to not determining that atleast one CORESET is configured for BWP of the serving cell of the BS (200) in which the aperiodic CSI-RS is received then, at S912, it is checked whether the UE (100) is configured with the enableDefaultBeamForCCS.

1. Scenario 1: In response to the DL signal with the indicated TCI state in same symbols as aperiodic CSI-RS then, S906, the UE (100) applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming when the reported value is one of the values {14,28,48} and enableBeamSwitchTiming-r16 is not provided, aperiodic CSI-RS scheduled with offset larger than or equal to 48 when the reported value of beamSwitch-Timing-r16 is one of the values {224, 336} and enable-BeamSwitchTiming-r16 is provided, periodic CSI-RS, semi-persistent CSI-RS.

2. Scenario 2: else if at least one CORESET is configured for the BWP in which the aperiodic CSI-RS is received, when receiving the aperiodic CSI-RS then, at S910, the UE (100) applies the QCL assumption based on one or more of the solutions/options listed below, in the latest slot in which one or more CORESETs within the active BWP of the serving cell are monitored;

a) Option 1: QCL assumption used for the CORESET associated with a monitored search space with the lowest controlResourceSetId.

b) Option 2: QCL assumption used for the CORESET associated with a monitored search space with the lowest controlResourceSetIdcombined with the QCL assumption of any CORESET linked with the CORESET with the lowest controlResourceSetId for PDCCH repetition.

3. Scenario 3: else if the UE (100) is configured with [enableDefaultBeamForCCS] and when receiving the aperiodic CSI-RS then, S914, the UE (100) applies the QCL assumption of the lowest-ID activated TCI state applicable to the PDSCH within the active BWP of the cell in which the CSI-RS is to be received.

When the triggering PDCCH and the triggered aperiodic CSI-RS are of different numerologies, the behavior defined in the previous sections for the case where the numerologies are the same applies with the following exceptions.

FIGS. 10a and 10b are example flow diagram (S712) illustrating various operations for applying the default beam rule in the beam behavior of the CSI-RS for the FeMIMO when the PDCCH and CSI-RS have different numerology and the PDCCH is configured with the SFN configuration, according to an embodiment as disclosed herein.

The FIGS. 10a and 10b defines the default beam behavior of Aperiodic CSI-RS, when the triggering PDCCH and the CSI-RS have different numerology and the PDCCH is configured with the SFN configuration. Further, the CSI-RS is QCLed with at least one of the CORESET configured in the active BWP. If the scheduling offset between the last symbol of the PDCCH carrying the triggering DCI and the first symbol of the aperiodic CSI-RS resources in a NZP-CSI-RS-ResourceSet configured without higher layer parameter trs-Info is smaller than the UE reported threshold beamSwitchTiming+d·$2^{\mu_{CSIRS}}/2^{\mu_{PDCCH}}$ in CSI-RS symbols, as defined in [13, TS 38.306], when the reported value is one of the values of {14, 28, 48} and enableBeamSwitchTiming-r16 is not provided, or is smaller than 48+d·$2^{\mu_{CSIRS}}/2^{\mu_{PDCCH}}$ (where subcarrier spacing for CSI-RS is 15 KHz*$2^{\mu_{CSIRS}}$ and subcarrier spacing for PDCCH is 15 KHz*$2^{\mu_{PDCCH}}$ where * denotes multiplication) in CSI-RS symbols when the reported value of beamSwitchTiming-r16 is one of the values of {224, 336} and enableBeamSwitchTiming-r16 is provided, where if the $\mu_{PDCCH}<\mu_{CSIRS}$, the beam switching timing delay d is defined in Table 1, else d is zero, if one of the associated trigger states has the higher layer parameter qcl-Type set to 'QCL-TypeD', where $\mu^{CSIRS}$ and $\mu^{PDCCH}$ are subcarrier spacing configurations of CSI-RS and PDCCH respectively, where subcarrier spacing for the CSI-RS is 15 KHz and $2^{\mu_{CSIRS}}$ and subcarrier spacing configuration for PDCCH is 15 KHz*$2^{\mu_{PDCCH}}$ where * denotes multiplication. The beam switching timing delay d is provided in table 1.

TABLE 1

| $\mu_{PDCCH}$ | d [PDCCH symbols] |
|---|---|
| 0 | 8 |
| 1 | 8 |
| 2 | 14 |

At S1002, the UE (100) determines that the PDCCH and the CSI-RS have different numerology and the PDCCH is configured with the SFN configuration. S1004, the UE (100) determines that the DL signal with indicated TCI state in same symbols as aperiodic CSI-RS. In response to not determining the DL signal with indicated TCI state in same symbols as aperiodic CSI-RS then, S1008, the UE (100) determines whether the CORESET configured for the BWP of the serving cell of the BS (200) in which the aperiodic CSI-RS is received. In response to not determining the CORESET configured for BWP of the serving cell of the BS (200) in which the aperiodic CSI-RS is received then, at S1012, the UE (100) checks if it is configured with the enableDefaultBeamForCCS.

1. Scenario 1: if there is any other DL signal with an indicated TCI state in the same symbols as the CSI-RS then, at S1006, the UE (100) applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming+d·$2^{\mu_{CSIRS}}/2^{\mu_{PDCCH}}$ in CSI-RS symbols when the reported value is one of the values {14,28,48} and enableBeamSwitchTiming-r16 is not provided, aperiodic CSI-RS scheduled with offset larger than or equal to 48+d·$2^{\mu_{CSIRS}}/2^{\mu_{PDCCH}}$ in CSI-RS symbols when the reported value of beamSwitchTiming-r16 is one of the values {224, 336} and enableBeamSwitchTiming-r16 is provided, periodic CSI-RS, semi-persistent CSI-RS.

2. Scenario 2: else, if at least one CORESET is configured for the BWP in which the aperiodic CSI-RS is to be received, when receiving the aperiodic CSI-RS, at least one CORESET is configured with more than one TCI state though PDCCH MAC-CE activation, when receiving the aperiodic CSI-RS, at S1010, the UE (100) applies the QCL assumption based on one or more of the solutions/options listed below, in the latest slot in which one or more CORE-SETs within the active BWP of the serving cell are monitored;

a) Option 1-1: QCL assumption corresponding to the lowest TCI state ID used for PDCCH quasi co-location indication of the CORESET associated with a monitored search space with the lowest controlResource-SetId.

b) Option 1-2: QCL assumption corresponding to the highest TCI state ID used for PDCCH quasi co-location indication of the CORESET associated with a monitored search space with the lowest controlResource-SetId.

c) Option 1-3: QCL assumption corresponding to the first TCI state ID used for PDCCH quasi co-location indication of the CORESET associated with a monitored search space with the lowest controlResourceSetId.

d) Option 1-4: QCL assumption corresponding to the last TCI state ID used for PDCCH quasi co-location indication of the CORESET associated with a monitored search space with the lowest controlResourceSetId.

e) Option 2: QCL assumption used for the CORESET associated with a monitored search space with the lowest controlResourceSetId, configured with a single TCI state.

f) Option 3: QCL assumption used for the CORESET associated with a monitored search space with the lowest controlResourceSetId; where the QCL assumption is a combination of the QCL parameters corresponding to the TCI states configured for the CORE-SET.

3. Scenario 3: else if the UE (100) is configured with [enableDefaultBeamForCCS], when receiving the aperiodic CSI-RS, at S1014, the UE (100) applies the QCL assumption of the lowest-ID activated TCI state applicable to the PDSCH within the active BWP of the cell in which the CSI-RS is to be received.

Figure 11A:
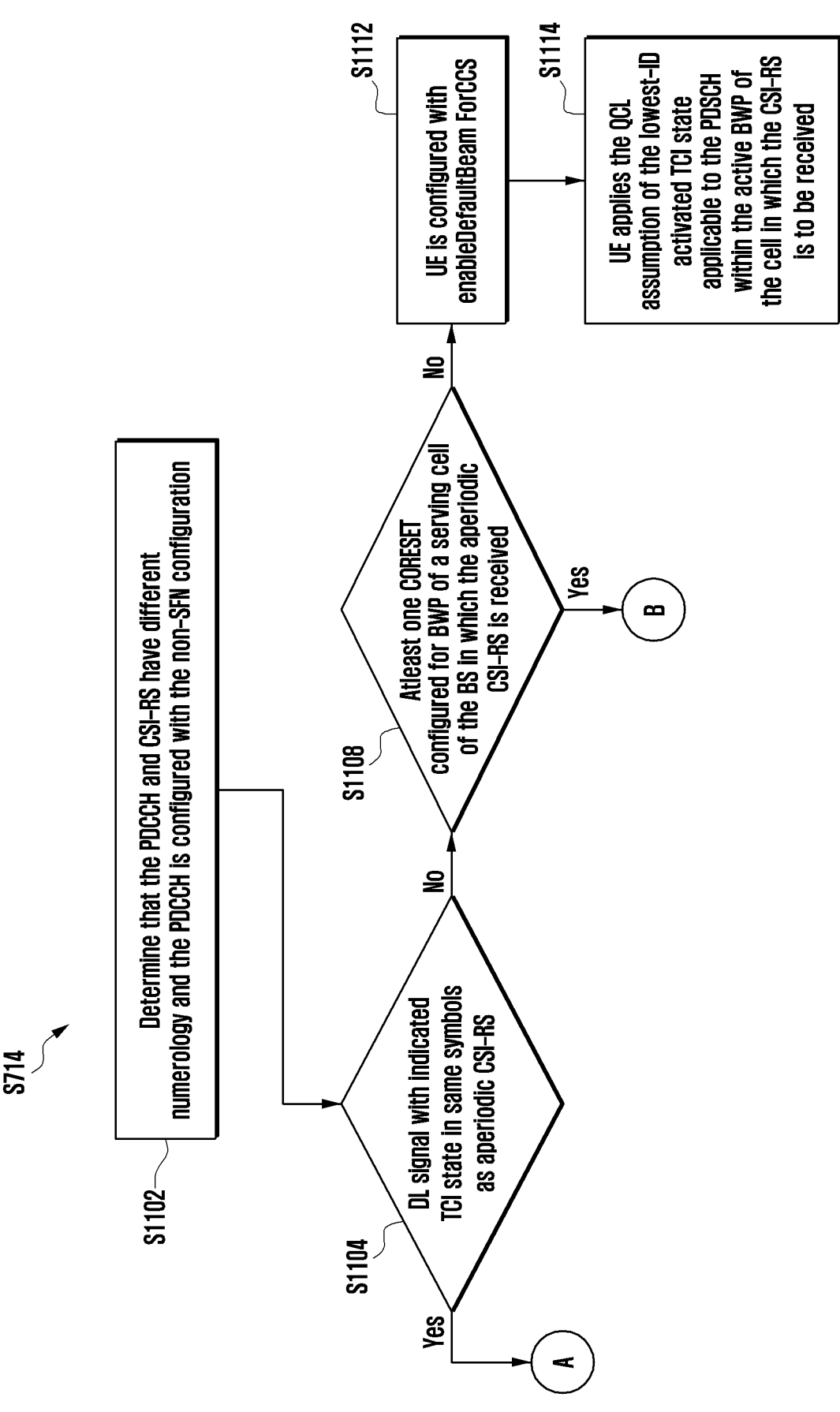
FIG. 11*a* is an example flow diagram illustrating various operations for applying the default beam rule in the beam behavior of the CSI-RS for the FeMIMO when the PDCCH and the CSI-RS have different numerology and the PDCCH is configured with the non-SFN configuration, according to an embodiment as disclosed herein.

FIGS. 11a and 11b are example flow diagram (S714) illustrating various operations for applying the default beam rule in the beam behavior of the CSI-RS for the FeMIMO when the PDCCH and the CSI-RS have different numerology and the PDCCH is configured with the 'Non-SFN Scheme', according to an embodiment as disclosed herein.

FIGS. 11a and 11b defines the default beam behavior of Aperiodic CSI-RS, when the triggering PDCCH and CSI-RS have different numerology and the PDCCH is configured with the non-SFN configuration. Further, the CSI-RS is QCLed with at least one of the CORESET configured in the active BWP. If the scheduling offset between the last symbol of the PDCCH carrying the triggering DCI and the first symbol of the aperiodic CSI-RS resources in a NZP-CSI-RS-ResourceSet configured without higher layer parameter trs-Info is smaller than the UE reported threshold beamSwitchTiming+d·$2^{\mu_{CSIRS}}/2^{\mu_{PDCCH}}$ in CSI-RS symbols, as defined in [13, TS 38.306], when the reported value is one of the values of {14, 28, 48} and enableBeamSwitchTiming-r16 is not provided, or is smaller than 48+d·$2^{\mu_{CSIRS}}/2^{\mu_{PDCCH}}$ in CSI-RS symbols when the reported value of beamSwitchTiming-r16 is one of the values of {224, 336} and enableBeamSwitchTiming-r16 is provided, where if the $\mu_{PDCCH}{<}\mu_{CSIRS}$, the beam switching timing delay d is defined in Table 1, else d is zero, if one of the associated trigger states has the higher layer parameter qcl-Type set to 'QCL-TypeD', At S1102, the UE (100) determines that the PDCCH and the CSI-RS have different numerology and the PDCCH is configured with the non-SFN configuration. At S1104, the UE (100) determines whether the DL signal with indicated TCI state in same symbols as aperiodic CSI-RS. In response to not determining the DL signal with indicated TCI state in same symbols as aperiodic CSI-RS then, at S1108, the UE (100) determines whether atleast one CORESET configured for the BWP of the serving cell of the BS (200) in which the aperiodic CSI-RS is received. In response to not determining atleast one CORESET configured for the BWP of the serving cell of the BS (200) in which the aperiodic CSI-RS is received then, at S1112, the UE (100) checks if it is configured with the enableDefaultBeamForCCS.

1. Scenario 1: if there is any other DL signal with the indicated TCI state in the same symbols as the CSI-RS, at S1106, the UE (100) applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming+d·$2^{\mu_{CSIRS}}/2^{\mu_{PDCCH}}$ in CSI-RS symbols when the reported value is one of the values {14,28,48} and enableBeamSwitchTiming-r16 is not provided, aperiodic CSI-RS scheduled with offset larger than or equal to 48+d·$2^{\mu_{CSIRS}}/2^{\mu_{PDCCH}}$ in CSI-RS symbols when the reported value of beamSwitchTiming-r16 is one of the values {224, 336} and enableBeamSwitchTiming-r16 is provided, periodic CSI-RS, semi-persistent CSI-RS.

2. Scenario 2: else, if at least one CORESET is configured for the BWP in which the aperiodic CSI-RS is to be received, when receiving the aperiodic CSI-RS, when receiving the aperiodic CSI-RS, at S1110, the UE (100) applies the QCL assumption based on one or more of the solutions//options listed below, in the latest slot in which one or more CORESETs within the active BWP of the serving cell are monitored.

a) Option 1: QCL assumption used for the CORESET associated with a monitored search space with the lowest controlResourceSetId.

b) Option 2: QCL assumption used for the CORESET associated with a monitored search space with the lowest controlResourceSetIdcombined with the QCL assumption of any CORESET linked with the CORESET with the lowest controlResourceSetId for PDCCH repetition.

3. Scenario 3: else if the UE (100) is configured with [enableDefaultBeamForCCS], when receiving the aperiodic CSI-RS, at 1114, the UE (100) applies the QCL assumption of the lowest-ID activated TCI state applicable to the PDSCH within the active BWP of the cell in which the CSI-RS is to be received.

The various actions, acts, blocks, steps, or the like in the flow charts (S500, S700 and S708-S714) may be performed in the order presented, in a different order or simultaneously. Further, in some embodiments, some of the actions, acts, blocks, steps, or the like may be omitted, added, modified, skipped, or the like without departing from the scope of the invention.

The proposed method considers various schemes/techniques used for mTRP physical downlink control channel (PDCCH) enhancement. Further, the proposed method proposes different UE behaviors towards the default beam consideration of CSI-RS under different scenarios.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) in a communication system, the method comprising:

receiving a physical downlink control channel (PDCCH) medium access control (MAC) control element (CE) including activation of more than one transmission configuration indication (TCI) states for a control resource set (CORESET) for monitoring a PDCCH, wherein the PDCCH is configured with a single frequency network (SEN) scheme;

determining a TCI state for an aperiodic channel state information-reference signal (CSI-RS) corresponding to an aperiodic CSI-RS resource in a non-zero power (NZP) CSI-RS resource set with which the UE is configured, wherein a TCI state is a first TCI state among the more than one TCI states is determined for the aperiodic CSI-RS in case of none of predefined downlink signals with an indicated TCI state being in same symbols as the aperiodic CSI-RS; and receiving the aperiodic CSI-RS using quasi-colocation (QCL) assumption corresponding to the determined TCI state.

2. The method of claim 1, wherein the PDCCH in the CORESET is monitored based on the QCL assumptions corresponding to the more than one TCI state.

3. The method of claim 1, wherein the CORESET is associated with a lowest CORESET identifier (ID).

4. The method of claim 1, wherein the first TCI state is used for receiving the CSI-RS in case of a scheduling offset between a last symbol of the PDCCH carrying triggering downlink control information (DCI) for the aperiodic CSI-RS and a first symbol of the aperiodic CSI-RS being smaller than a UE reported threshold corresponding to a beam switching time.

5. A user equipment (UE) in a communication system, the UE comprising:

a transceiver; and a processor coupled with the transceiver and configured to:

receive a physical downlink control channel (PDCCH) medium access control (MAC) control element (CE) including activation of more than one transmission configuration indication (TCI) states for a control resource set (CORESET) for monitoring a PDCCH, wherein the PDCCH is configured with a single frequency network (SFN) scheme;

determine a TCI state for an aperiodic channel state information-reference signal (CSI-RS) corresponding to an aperiodic CSI-RS resource in a non-zero power (NZP) CSI-RS resource set with which the UE is configured, wherein a TCI state is a first TCI state among the more than one TCI states determined for the aperiodic CSI-RS in case of none of predefined downlink signals with an indicated TCI state being in same symbols as the aperiodic CSI-RS; and receive the aperiodic CSI-RS using quasi-colocation (QCL) assumption corresponding to the determined TCI state.

6. The UE of claim 5, wherein the PDCCH in the CORESET is monitored based on QCL assumptions corresponding to the more than one TCI states.

7. The UE of claim 5, wherein the CORESET is associated with a lowest CORESET identifier (ID).

8. The UE of claim 5, wherein the first TCI state is used for receiving the CSI-RS in case of a scheduling offset between a last symbol of the PDCCH carrying triggering downlink control information (DCI) for the aperiodic CSI-RS and a first symbol of the aperiodic CSI-RS being smaller than a UE reported threshold corresponding to a beam switching time.

9. A method performed by a base station in a communication system, the method comprising:

transmitting, to a user equipment (UE), a physical downlink control channel (PDCCH) medium access control (MAC) control element (CE) including activation of more than one transmission configuration indication (TCI) states for a control resource set (CORESET) for a PDCCH, wherein the PDCCH is configured with a single frequency network (SFN) scheme; and transmitting, to the UE, an aperiodic channel state information-reference signal (CSI-RS) corresponding to an aperiodic CSI-RS resource in a non-zero power (NZP) CSI-RS resource set with which the UE is configured, wherein the aperiodic CSI-RS is associated with quasi-colocation (QCL) assumption corresponding a first TCI state among the more than one TCI states in case of none of predefined downlink signals with an indicated TCI state being in same symbols as the aperiodic CSI-RS.

10. The method of claim 9, wherein the PDCCH transmitted in the CORESET is associated with QCL assumptions corresponding to the more than TCI states.

11. The method of claim 9, wherein the CORESET is associated with a lowest CORESET identifier (ID).

12. The method of claim 9, wherein the first TCI state is associated with the CSI-RS in case of a scheduling offset between a last symbol of the PDCCH carrying triggering downlink control information (DCI) for the aperiodic CSI-RS and a first symbol of the aperiodic CSI-RS being smaller than a UE reported threshold corresponding to a beam switching time.

13. A base station in a communication system, the base station comprising:

a transceiver; and a processor coupled with the transceiver and configured to:

transmit, to a user equipment (UE), a physical downlink control channel (PDCCH) medium access control (MAC) control element (CE) including activation of more than one transmission configuration indication (TCI) states for a control resource set (CORESET) for a PDCCH, wherein the PDCCH is configured with a single frequency network (SFN) scheme, and transmit, to the UE, an aperiodic channel state information-reference signal (CSI-RS) corresponding to an aperiodic CSI-RS resource in a non-zero power (NZP) CSI-RS resource set with which the UE is configured, wherein the aperiodic CSI-RS is associated with quasi-colocation (QCL) assumption corresponding a first TCI state among the more than one TCI states in case of none of predefined downlink signals with an indicated TCI state being in same symbols as the aperiodic CSI-RS.

14. The base station of claim 13, wherein the PDCCH transmitted in the CORESET is associated with QCL assumptions corresponding to the more than TCI states.

15. The base station of claim 13, wherein the CORESET is associated with a lowest CORESET identifier (ID).

16. The base station of claim 13, wherein the first TCI state is associated with the CSI-RS in case of a scheduling offset between a last symbol of the PDCCH carrying triggering downlink control information (DCI) for the aperiodic CSI-RS and a first symbol of the aperiodic CSI-RS being smaller than a UE reported threshold corresponding to a beam switching time.

* * * * *